(12) United States Patent
Cosby et al.

(10) Patent No.: US 10,296,036 B2
(45) Date of Patent: May 21, 2019

(54) MODULAR PEDAL ASSEMBLY FOR VEHICLES

(75) Inventors: Christopher D. Cosby, Augusta, GA (US); Douglas T. Crow, Evans, GA (US); David R. Hardy, Hephzibah, GA (US); Paul E. Morgan, Appling, GA (US); Duane E. Newman, Evans, GA (US); Geoff D. Stewart, Evans, GA (US); Michael L. Welsh, Evans, GA (US)

(73) Assignee: Club Car, LLC, Evans, GA (US)

( * ) Notice: Subject to any disclaimer, the term of this patent is extended or adjusted under 35 U.S.C. 154(b) by 1161 days.

(21) Appl. No.: 12/903,289

(22) Filed: Oct. 13, 2010

(65) Prior Publication Data

US 2011/0023652 A1 Feb. 3, 2011

Related U.S. Application Data

(62) Division of application No. 10/543,344, filed as application No. PCT/US2004/002120 on Jan. 26, 2004, now abandoned.
(Continued)

(51) Int. Cl.
*G05G 1/30* (2008.04)
*B60Q 1/44* (2006.01)
(Continued)

(52) U.S. Cl.
CPC .............. *G05G 1/30* (2013.01); *B60Q 1/441* (2013.01); *G05G 1/36* (2013.01); *G05G 1/38* (2013.01);
(Continued)

(58) Field of Classification Search
CPC ............ G05G 1/30; G05G 1/305; G05G 1/36; G05G 1/38; G05G 1/44; G05G 1/445;
(Continued)

(56) References Cited

U.S. PATENT DOCUMENTS 1,325,430 A * 12/1919 Willett ............................ 74/526
1,455,570 A *  5/1923 Cassara ....................... 74/484 R
(Continued)

FOREIGN PATENT DOCUMENTS

| DE | 20209568 U1 | 10/2002 | |
| DE | 102007040541 A1 * | 3/2009 | ............. B60K 23/00 |
| FR | 2866130 A1 * | 8/2005 | ............. B60T 7/042 |

*Primary Examiner* — Daniel D Yabut
(74) *Attorney, Agent, or Firm* — Taft Stettinius & Hollister LLP

(57) ABSTRACT

A modular pedal assembly for use with a vehicle that includes a prime mover, a control circuit, and a brake assembly. The modular pedal assembly including a base that is removably connectable with the vehicle, a brake pedal, an accelerator pedal that is displaceable between a first position and a second position, and a control output regulator that includes a first sensor and a second sensor. In a vehicle having an electric motor prime mover, the first sensor is a limit switch electrically connected to the control circuit, and the second sensor is a variable resistor. In a vehicle having an internal combustion engine prime mover, the first sensor is a limit switch operable to control a starter motor, and the second sensor is a limit switch operable to control a spark plug ignition.

23 Claims, 27 Drawing Sheets

Related U.S. Application Data

(60) Provisional application No. 60/442,577, filed on Jan. 24, 2003.

(51) Int. Cl.

| | |
|---|---|
| *G05G 1/36* | (2008.04) |
| *G05G 1/38* | (2008.04) |
| *G05G 1/46* | (2008.04) |
| *G05G 5/00* | (2006.01) |
| *G05G 5/12* | (2006.01) |
| *B60K 26/00* | (2006.01) |

(52) U.S. Cl.
CPC ............... *G05G 1/46* (2013.01); *G05G 5/005* (2013.01); *G05G 5/12* (2013.01); *B60K 26/00* (2013.01); *Y10T 74/20528* (2015.01); *Y10T 74/20534* (2015.01)

(58) Field of Classification Search
CPC ... G05G 1/46; G05G 5/24; G05G 5/18; B60K 26/021; B60K 26/02; B60T 7/045; B60T 7/042; B60T 7/04; B60T 7/06; B60T 7/047
USPC ................ 74/512–514, 560, 542; 188/73.31; 477/210; 303/20
See application file for complete search history.

(56) References Cited

U.S. PATENT DOCUMENTS

| | | | | |
|---|---|---|---|---|
| 1,459,233 | A | * | 6/1923 | Moldenhauer ............... 74/513 |
| 1,469,258 | A | | 10/1923 | Geistert |
| 1,562,057 | A | * | 11/1925 | Rogers ............... 74/539 |
| 1,608,382 | A | * | 11/1926 | Fox ............... 74/539 |
| 2,542,410 | A | * | 2/1951 | Hedges ............... 477/210 |
| 3,003,365 | A | * | 10/1961 | Mckenzie ............... 74/542 |
| 3,109,320 | A | * | 11/1963 | Krautwurst ............... 74/529 |
| 3,240,299 | A | | 3/1966 | Buchwald |
| 3,273,418 | A | * | 9/1966 | Ellis ............... 74/539 |
| 3,630,326 | A | | 12/1971 | Kawaguchi |
| 3,936,707 | A | | 2/1976 | Yoshida et al. |
| 4,036,078 | A | * | 7/1977 | Muehling ............... 74/529 |
| 4,060,144 | A | * | 11/1977 | Teti ............... 74/513 |
| 4,087,776 | A | * | 5/1978 | Donato ............... 74/512 |
| 4,142,135 | A | | 2/1979 | Fujita |
| 4,278,143 | A | | 7/1981 | Nagai |
| 4,297,550 | A | | 10/1981 | Leighton |
| 4,385,529 | A | * | 5/1983 | Ejiri et al. ............... 74/535 |
| 4,441,380 | A | * | 4/1984 | Kawaguchi et al. ............ 74/512 |
| 4,590,385 | A | | 5/1986 | Hamano et al. |
| 4,597,307 | A | * | 7/1986 | Kawaguchi et al. ............ 74/512 |
| 4,884,403 | A | | 12/1989 | Weber |
| 5,056,742 | A | | 10/1991 | Sakurai |
| 5,217,280 | A | | 6/1993 | Nykerk et al. |
| 5,309,361 | A | | 5/1994 | Drott et al. |
| 5,438,516 | A | * | 8/1995 | Neubauer et al. ............ 74/514 |
| 5,477,116 | A | | 12/1995 | Journey |
| 5,588,335 | A | | 12/1996 | Strait |
| 5,761,967 | A | | 6/1998 | Papenhagen |
| 5,886,628 | A | | 5/1999 | Alhassoon |
| 6,070,490 | A | | 6/2000 | Aschoff et al. |
| 6,138,802 | A | | 10/2000 | McFarlane et al. |
| 6,223,865 | B1 | | 5/2001 | Lang et al. |
| 6,275,024 | B1 | | 8/2001 | Uneme et al. |
| 6,324,939 | B1 | | 12/2001 | Cicotte |
| 6,364,047 | B1 | | 4/2002 | Bortolon |
| 6,415,681 | B1 | | 7/2002 | Porter et al. |
| 6,446,500 | B1 | | 9/2002 | Marquardt et al. |
| 6,446,525 | B1 | | 9/2002 | Borchers |
| 6,457,568 | B2 | | 10/2002 | Lang et al. |
| 6,536,300 | B1 | * | 3/2003 | Gonring ............... 74/513 |
| 6,862,950 | B2 | * | 3/2005 | O'Neill ............... G05G 1/36 74/512 |
| 6,886,427 | B2 | * | 5/2005 | McVicar ............... 74/560 |
| 6,962,094 | B2 | * | 11/2005 | Porter ............... G05G 1/405 74/512 |
| 7,343,830 | B2 | * | 3/2008 | Rinero ............... G05G 1/405 74/512 |
| 2001/0054957 | A1 | | 12/2001 | Cohen et al. |
| 2002/0178859 | A1 | | 12/2002 | Porter et al. |
| 2003/0094070 | A1 | | 5/2003 | O'Neill |

* cited by examiner

MODULAR PEDAL ASSEMBLY FOR VEHICLES

RELATED APPLICATIONS

This application is a divisional application of U.S. patent application Ser. No. 10/543,344, filed May 19, 2006 which is a National Stage entry of P.C.T. Application No. PCT/US04/02120, filed Jan. 26, 2004 which claims priority to U.S. Provisional Application Ser. No. 60/442,577, filed Jan. 24, 2003, the entire contents of all above listed applications are incorporated herein by reference.

BACKGROUND

This invention relates to vehicles such as golf cars, utility vehicles, and neighborhood vehicles, and more particularly to accelerator pedals and brake pedals for such vehicles.

Conventional golf cars and utility vehicles may be expensive and time consuming to assemble. This is because most conventional vehicles and utility vehicles are assembled one piece at a time, stacking each upon the next, and the amount of time and labor required to assemble a conventional vehicle may be substantial because of this process. Golf cars and utility vehicles may have either an electric motor drive system or an internal combustion engine drive system, and the footprint and packaging of an electric drive system may be significantly different than the footprint and packaging of a gas drive system. Therefore, during the assembly of a conventional golf car or utility vehicle, the difference in the sizes and shapes of parts may require as much as two separate chassis for electric and gas drive vehicles, and most conventional accelerator assemblies are different for an electric drive vehicle then for a gas drive vehicle. This is because the parts coupled to the accelerator and the interconnection of the accelerator with the drive system may vary significantly between drive systems.

SUMMARY

In one embodiment, the invention provides a modular pedal assembly for use with a vehicle. The vehicle includes a prime mover, a control circuit operatively connected with the prime mover, and a brake assembly. The pedal assembly includes a base that is removably connectable with the vehicle, a brake pedal that is movably coupled with the base and operatively coupled with the brake assembly, an accelerator pedal that is movably coupled with the base so as to be displaceable between a first position and a second position and operatively coupled with one of the prime mover and the control circuit, and a control output regulator that includes a first sensor and a second sensor, and is electrically connectable with the control circuit such that the control circuit at least one of regulates the motor and operates the motor. In a vehicle having an electric motor prime mover, the first sensor is a limit switch electrically connected to the control circuit to selectively turn on the control circuit, and the second sensor is a variable resistor that generates a signal proportional to a displacement of the accelerator pedal between the first position and the second position. In a vehicle having an internal combustion engine prime mover, the first sensor is a limit switch operable to control a starter motor of the internal combustion engine, and the second sensor is a limit switch operable to control a spark plug ignition of the internal combustion engine.

In another embodiment, the invention provides a modular pedal assembly mountable as a module upon a vehicle having a brake assembly and adaptable for use on a vehicle having either a gas engine or an electric motor drive. The modular pedal assembly has a mounted state in which the modular pedal assembly is mounted in the vehicle and an unmounted state. The modular pedal assembly includes a base that is adapted to be mounted in a vehicle in the mounted state. A first pedal is pivotally coupled to the base in the unmounted state of the modular pedal assembly and has a portion coupled to the brake assembly in the mounted state of the modular pedal assembly. A second pedal is pivotally coupled to the base in the unmounted state of the modular pedal assembly and has a portion coupled to the drive in the mounted state of the modular pedal assembly. The second pedal has an unactuated state and an actuated state. The actuated state is defined by pivotal movement of the second pedal with respect to the base. A control output regulator is coupled to the second pedal in the unmounted state of the modular pedal assembly and is also electrically coupled to the drive assembly in the mounted state of the modular pedal assembly. The control output regulator is adaptable to be used with vehicles driven by gas engines and electrical motors, and includes a sensor configured to detect the pivotal position of the second pedal and to communicate the position to the drive in the mounted state of the modular pedal assembly.

BRIEF DESCRIPTION OF THE DRAWINGS

The invention is further described with reference to the accompanying drawings, which illustrate one or more embodiments of the invention. However, it should be noted that the invention as disclosed in the accompanying drawings is illustrated by way of example only. The various elements and combinations of elements described below and illustrated in the drawings may be arranged and organized differently to result in embodiments which are still within the spirit and scope of the present invention in the drawings, wherein like reference numeral indicate like parts.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 29:
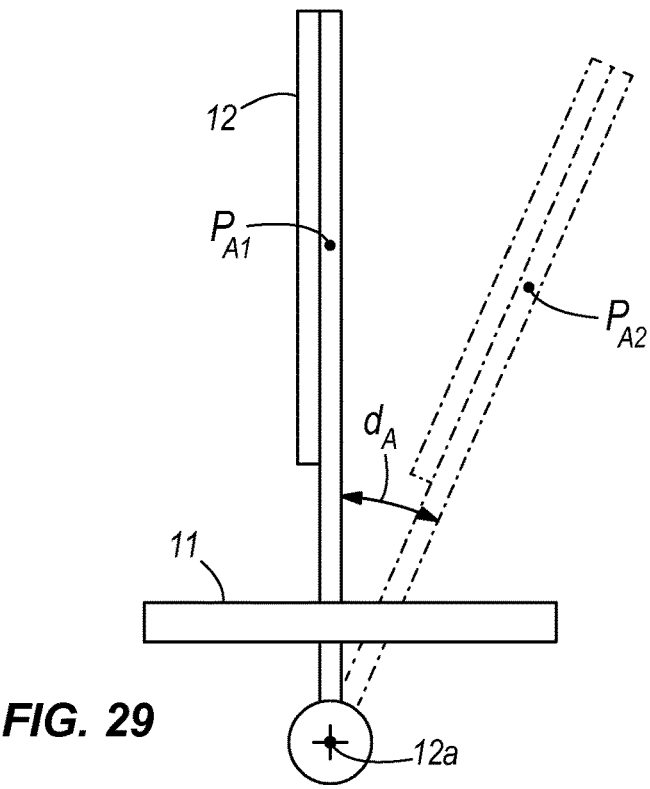
FIG. 29 is a more diagrammatic illustration of the accelerator pedal, depicting two limit positions of the pedal.
Figure 30:
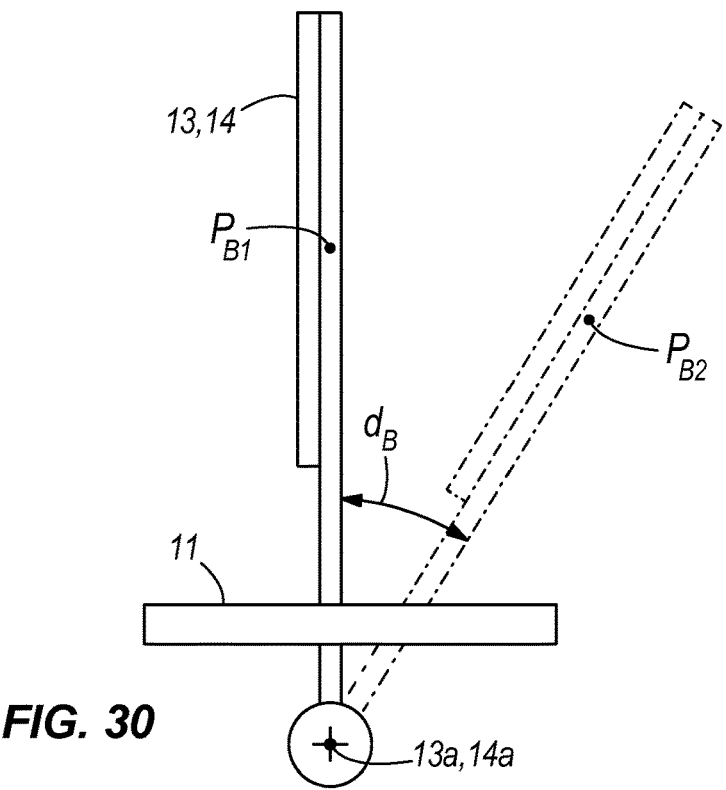
FIG. 30 is a more diagrammatic illustration of the brake pedals, depicting two limit positions of the pedal.

Referring to the drawings in detail, wherein like numbers are used to indicate like elements throughout, there is shown in FIGS. 1-29 a preferred construction of a modular pedal assembly 10 for use with a vehicle 1, the vehicle 1 including a motor 2, a control circuit 3 operatively connected with the motor 2, and a brake assembly 4. The modular pedal assembly 10 basically comprises a base 11 removably connectable with the vehicle 1, an accelerator pedal 12 and at least one and preferably two brake pedals 13, 14 movably coupled with the base 11, and at least one sensor 15 configured to sense displacement of the accelerator pedal 12. As depicted in FIG. 29, the accelerator pedal 12 is displaceable between a first, initial position $P_{A1}$, at which the pedal 12 is in an "unactuated state", and a second, maximum travel position $P_{A2}$, the pedal 12 being in an, "actuated state" at the second position $P_{A2}$ and all positions between the two limit positions $P_{A1}$, $P_{A2}$. Preferably, the accelerator pedal 12 is pivotally coupled with the base 11, so as to be angularly displaceable about an axis 12a, and is operatively coupleable with the motor 2 and/or with the control circuit 3. Each brake pedal 13, 14 is preferably pivotally coupled with the base 11, so as to be angularly displaceable about an axis 13a, 14a between a first, initial position $P_{B1}$ and a second, maximum travel position $P_{B2}$ (FIG. 30) and are each operatively coupled with the brake assembly 4 of the vehicle 1, as discussed below. The "service" brake pedal 13 is used for braking or stopping of the vehicle 1 during vehicle operation and the "parking" brake pedal 14 is used to maintain the brake assembly 4 engaged with the wheel shafts (not shown) and is releasably lockable at the second position $P_{B2}$. Preferably, the accelerator pedal 12 is operatively coupled with the parking brake pedal 14, such that when the brake pedal 14 is locked at the second position $P_{B2}$, displacement of the accelerator pedal 12 releases the parking brake pedal 14 from the second position $P_{B2}$.

Further, the one or more sensors 15 are each configured to sense displacement of the accelerator pedal 14 and each is electrically connectable with the control circuit 3. As such, the control circuit 3 regulates and/or operates the motor 2 and/or operates the motor 2 when the sensor 15 senses displacement of the accelerator pedal 12, i.e., when the accelerator pedal 12 "actuates" by displacing from the initial position $P_{A1}$ toward the second, maximum travel position $P_{A2}$. Preferably, the one or more sensors 15 are incorporated into a control output regulator 16 of the pedal assembly 10 that also includes a housing 24 or 34, the sensor(s) 15 being disposed within the housing 24 or 34. The housing 24 or 34 is removably connected with the base 11 so as to position the sensor 15 generally proximal to the accelerator pedal 12, as described in further detail below.

Referring to FIGS. 11A and 11B, the modular pedal assembly 10 may be used with a vehicle 1 having a motor 2 that is either an electric motor 28 or an internal combustion or "gas" engine 37, the primary difference being the particular control output regulator 16 connected with the base 11. More specifically, when the motor 2 is an electric motor 28, the vehicle 1 includes a battery 31 and the control circuit 3 includes a controller 27 configured to regulate either the voltage or the current between the battery 31 and the motor 28. An "electric" motor control output regulator 23 preferably includes a housing 24 and two sensors 15 disposed within the housing 24, specifically a first sensor 25 and a second sensor 26. The first sensor 25 is a limit switch electrically connected with the controller 27 such that the controller 27 is "turned-on" when the pedal 12 displaces from the initial position $P_{A1}$ and towards the second position $P_{A2}$. The second sensor 26 is variable resistor or potentiometer configured to generate a signal proportional to a displacement $d_A$ of the accelerator pedal 12 from the initial position $P_{A1}$, such that the controller 27 adjusts either the voltage or current to the motor 28 to be generally proportional to pedal displacement $d_A$ (FIG. 29).

Alternatively, when the motor 2 is a gas engine 37, the engine 37 has at least one and preferably a plurality of spark plugs and a starter motor, and the control circuit 3 includes a starter circuit with a solenoid 39 operatively coupled with the starter motor and a magneto 41 electrically coupleable with the spark plugs, as depicted in FIG. 11B. A "gas" motor control output regulator 33 preferably includes a housing 34 and two sensors 15 disposed within the housing 34, specifically a first sensor 35 and a second sensor 36. The first sensor 35 is a limit switch electrically connected with the solenoid 39 such that the solenoid 39 is electrically connected with the starter motor of the engine 37 when the accelerator pedal 12 displaces from the initial position $P_{A1}$ and towards the second position $P_{A2}$. The second sensor 37 is a limit switch electrically connected with the magneto 41 such that the magneto 41 is electrically coupled with the spark plugs when the accelerator pedal 12 displaces from the initial position $P_{A1}$. Further, with a gas engine 37, the engine 37 preferably includes a carburetor 43 with a throttle and the accelerator pedal 12 is operatively connected with the throttle by means of a cable 43a. Having described the basic components and operation of the present invention, these and other elements of the modular pedal assembly 12 are described in greater detail below.

Referring first to FIGS. 1-4, the modular pedal assembly 10 is preferably used with a vehicle 1 that is constructed as a golf car 1 (as shown) or a utility vehicle. The preferred vehicle 1 includes a body or chassis 5 that has an underbody portion 6 to which the modular pedal assembly 10 is preferably mounted. Specifically, the underbody portion 6 includes a mounting cavity 7 sized to receive the pedal group 10, as discussed in further detail below. Although preferably used with the above-described vehicle 1, the modular pedal assembly 10 of the present invention may be used with any other type of vehicle. For example, the modular pedal 10 may be used with a vehicle 1 that is a standard passenger automobile, a sports utility vehicle, a commercial truck, an off-road vehicle (e.g., dune buggy) having any type of drive system and/or other appropriate structure for connecting the pedal assembly 10 with the vehicle 1 (no alternatives shown).

Figure 1:
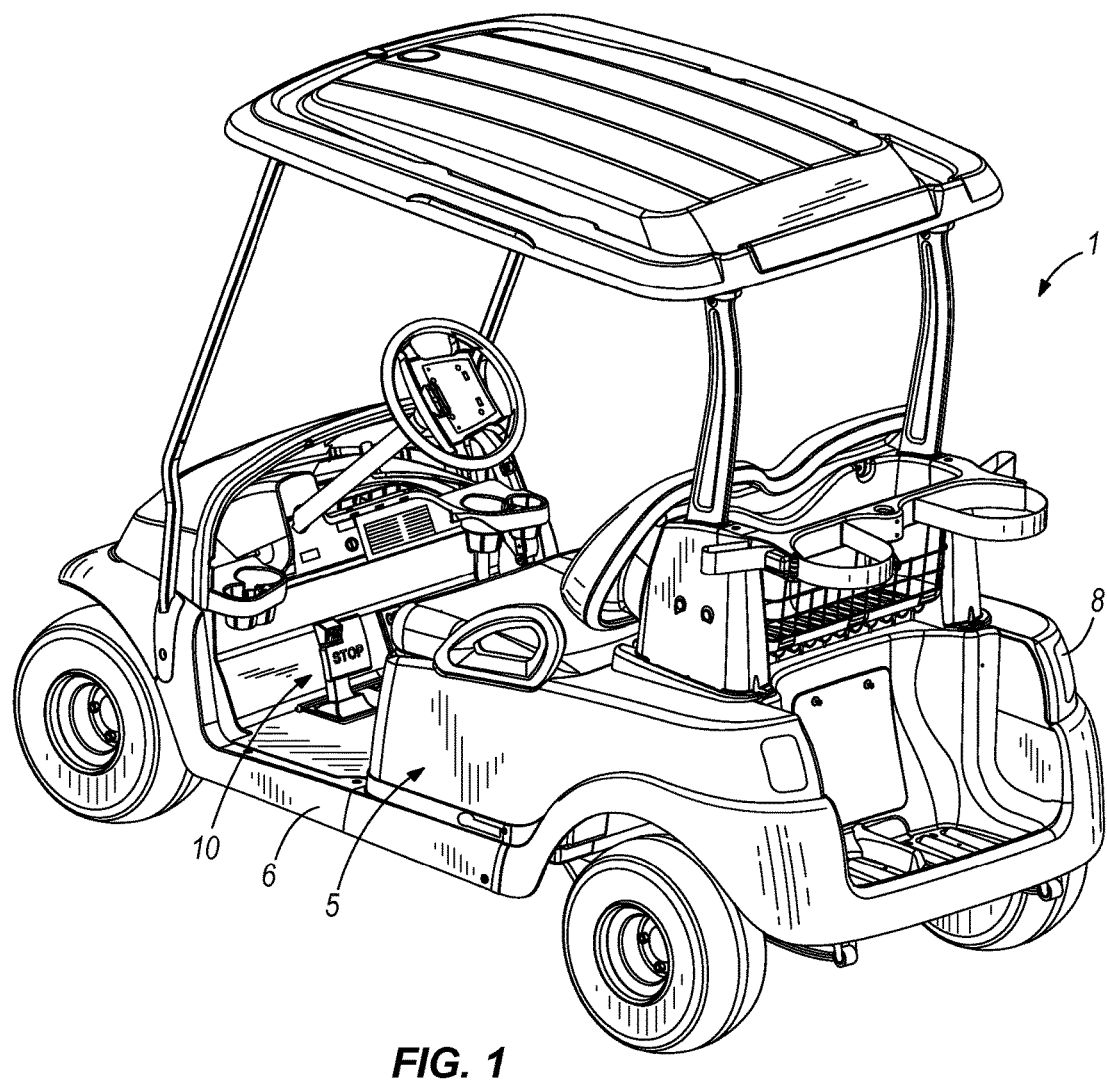
FIG. 1 is a perspective view of a vehicle having a modular pedal assembly in accordance with the present invention.
Figure 2:
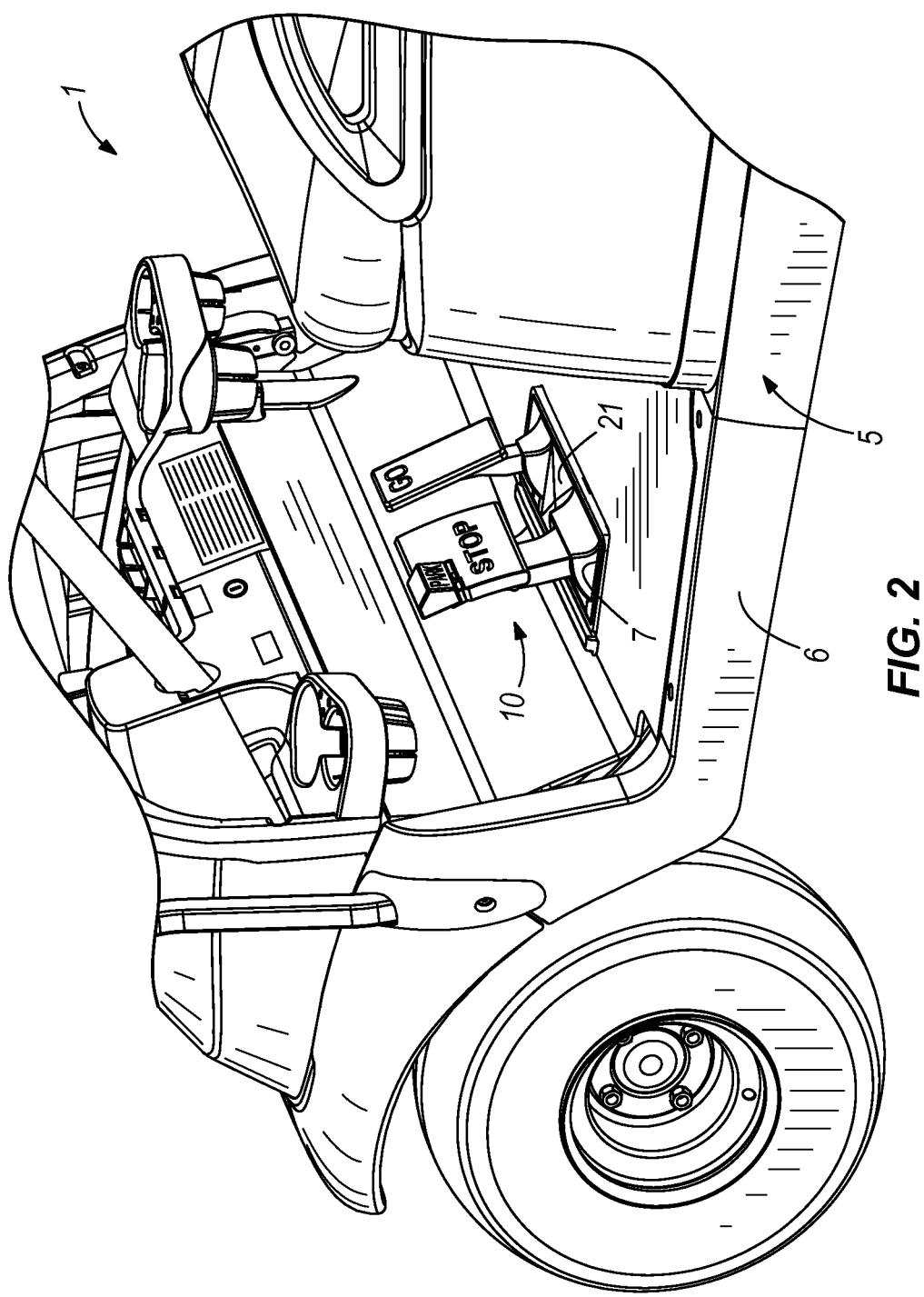
FIG. 2 is a partial prospective view of the vehicle illustrated in FIG. 1 showing the modular pedal assembly.
Figure 3:
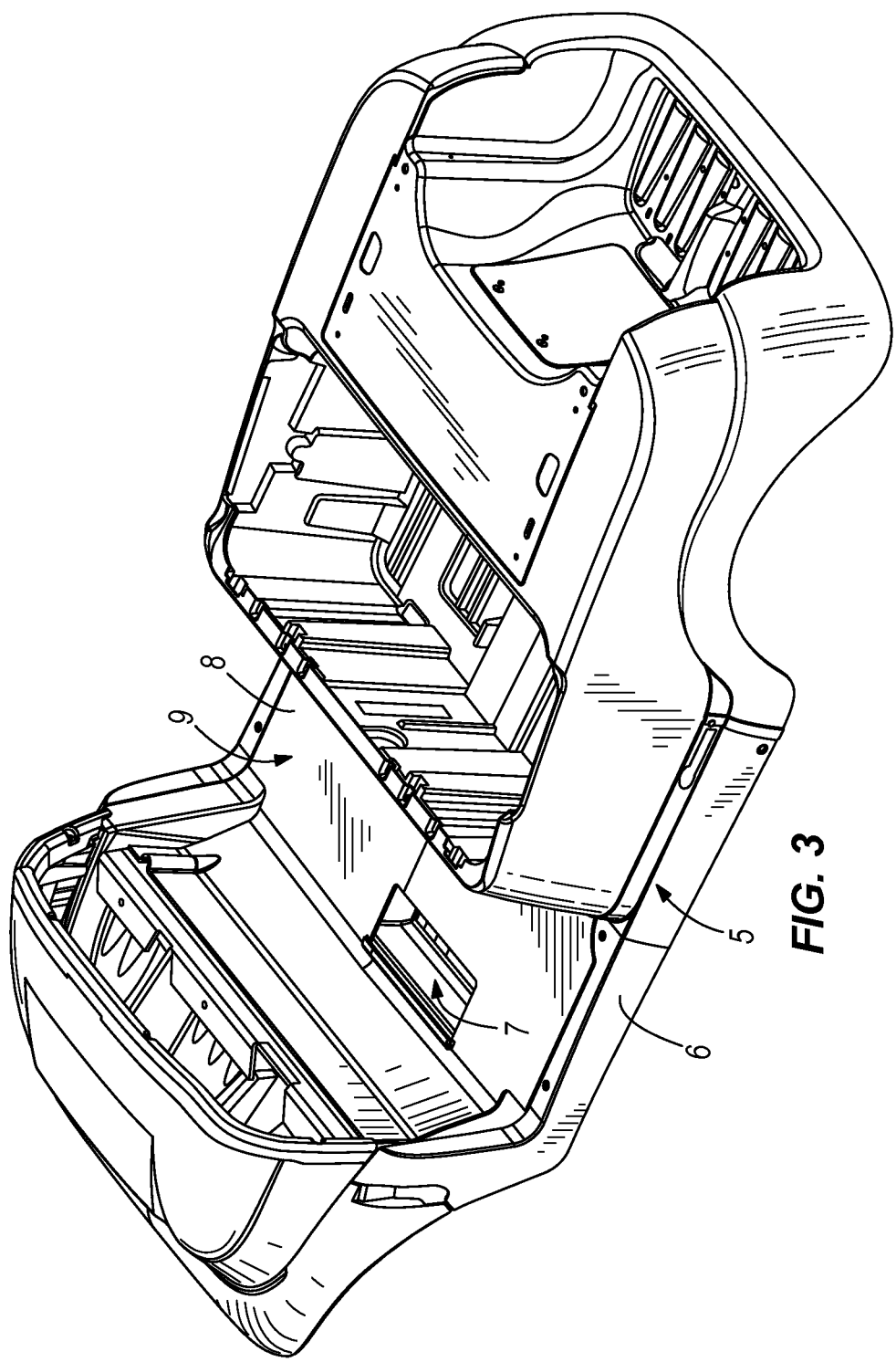
FIG. 3 is a perspective view of a portion of the decorative body of the vehicle illustrated in FIG. 1.
Figure 4:
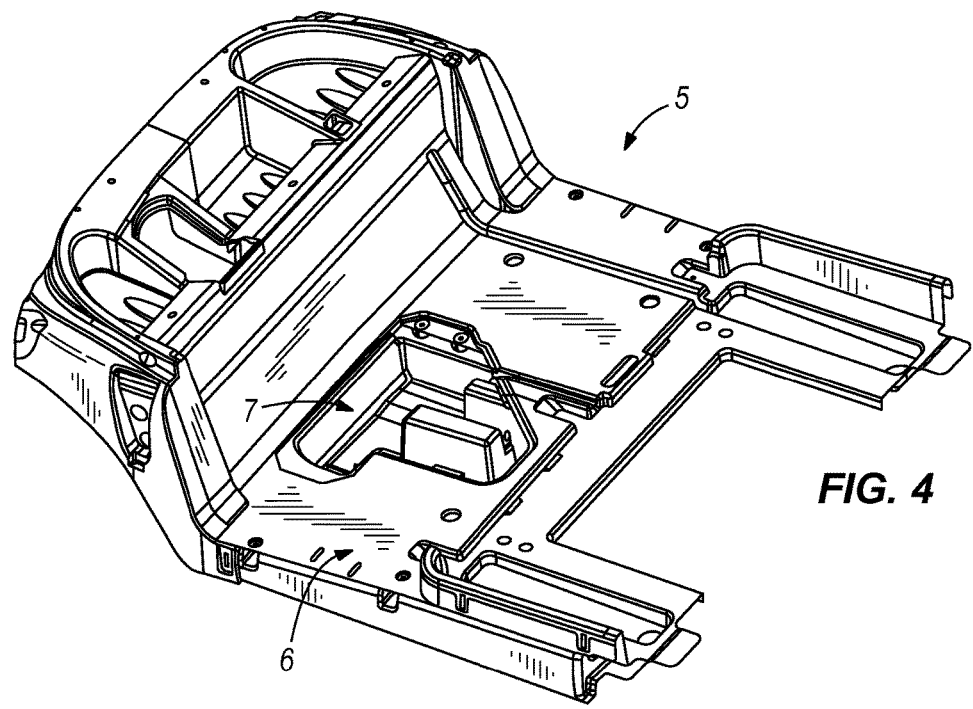
FIG. 4 is a perspective view of one embodiment of the underbody or chassis of the vehicle illustrated in FIG. 1.
Figure 5:
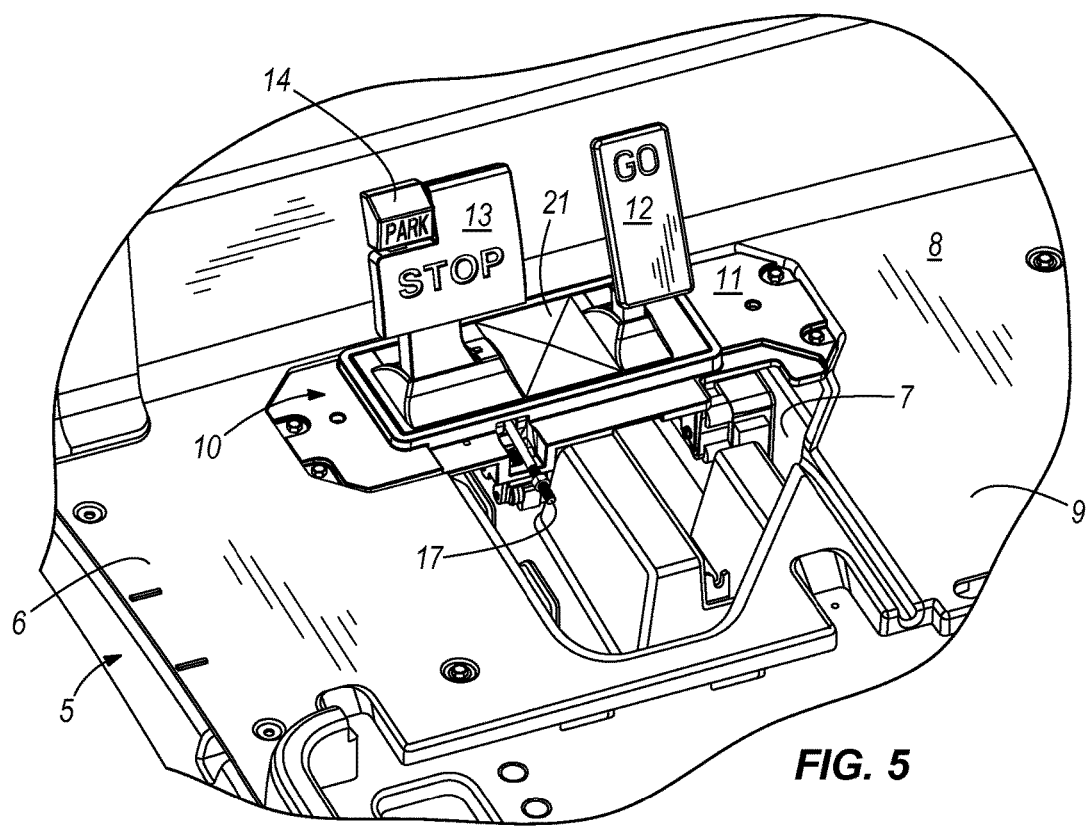
FIG. 5 is a partial perspective view of the underbody illustrated in FIG. 4.

Preferably, the pedal assembly 10 is coupled to the vehicle 1 as a modular unit or "module". Specifically, the base 11 is connectable with the vehicle 1 to connect the entire modular pedal assembly 10 to the vehicle 1 and the base 11 is alternatively removable from the vehicle 1 to remove the entire modular pedal assembly 10 from the vehicle 1. A such, the pedals 12, 13 and 14 are coupled or connected with the base 11 before the base 11 is mounted on the vehicle 1, and then the pedals 12, 13, 14 are correctly positioned on the vehicle 1 when the base 11 is connected or mounted thereto. FIGS. 4 and 5 illustrate how a modular pedal assembly 10 may be mounted with respect to vehicle 1, preferably to the body 5 of the vehicle. Preferably, the vehicle body or chassis 5 has an aperture or mounting cavity 7 designed to receive and secure the modular pedal assembly 10 to the vehicle 1. Furthermore, the aperture/cavity 7 of the chassis 5 is designed to house and protect many of the moving and electrical parts (if any) from the environment.

As illustrated in FIG. 5, the modular pedal assembly 10, including the base 11, the pedals 13, 14, and a control output regulator 16, is placed within the cavity 7 of the chassis as an assembled module. As such, very little manipulation or adjustment of the modular pedal assembly 10 is required once placed onto the chassis 5. In the illustrated embodiment, for example, the brake output rod 17 is then connected to the brake system 4 by a brake cable 4a, two electrical connections 3a are made with the control circuit 3a, 3b, and depending on the drive system, the accelerator pedal 12 may be coupled directly to the motor 2. After these items are connected, an upper body panel 8, including floorboards 9, may be placed around and partially over the modular pedal assembly 10 and connected with the underbody 6. As illustrated, the floorboards 9 cover and protect the cables and electrical components of the modular pedal assembly 10 from the environment. Returning to FIG. 2, in the fully assembled state only a portion of the pedals and a debris shield 21 of the modular pedal assembly 10 are exposed to the environment.

Although the pedal assembly 10 is illustrated as being mounted on the floor of a vehicle 1, the pedal assembly 10 may be mounted in other areas such as the inclined area between the floorboard and the dash of the vehicle 1. As discussed above and shown in FIGS. 6-11, the modular pedal assembly 10 has a base 11 and a plurality of pedals coupled to the base 11, which may include any combination of an accelerator pedal assembly 12, a service brake pedal assembly 13, a parking brake pedal assembly 14, clutch pedal, or any other appropriate vehicle pedal. Although the illustrated embodiment comprises an accelerator pedal assembly 12, a service brake pedal assembly 13, and a parking brake pedal assembly 14, it should be noted that the parking brake pedal 14 is not necessary for all applications.

The pedals may be coupled to the base 11 by one or more moveable connections, such as a pivot. The accelerator pedal 12 is coupled to the base 11 by a first pivot 19 and the service brake 13 and parking brake 14 are coupled to the base 11 by a second pivot 20. Although two separate pivots are used in the embodiment illustrated in the figures, other embodiments may use more or less pivots then illustrated. For example, some embodiments may use a single pivot for two or more pedals.

Figure 9:
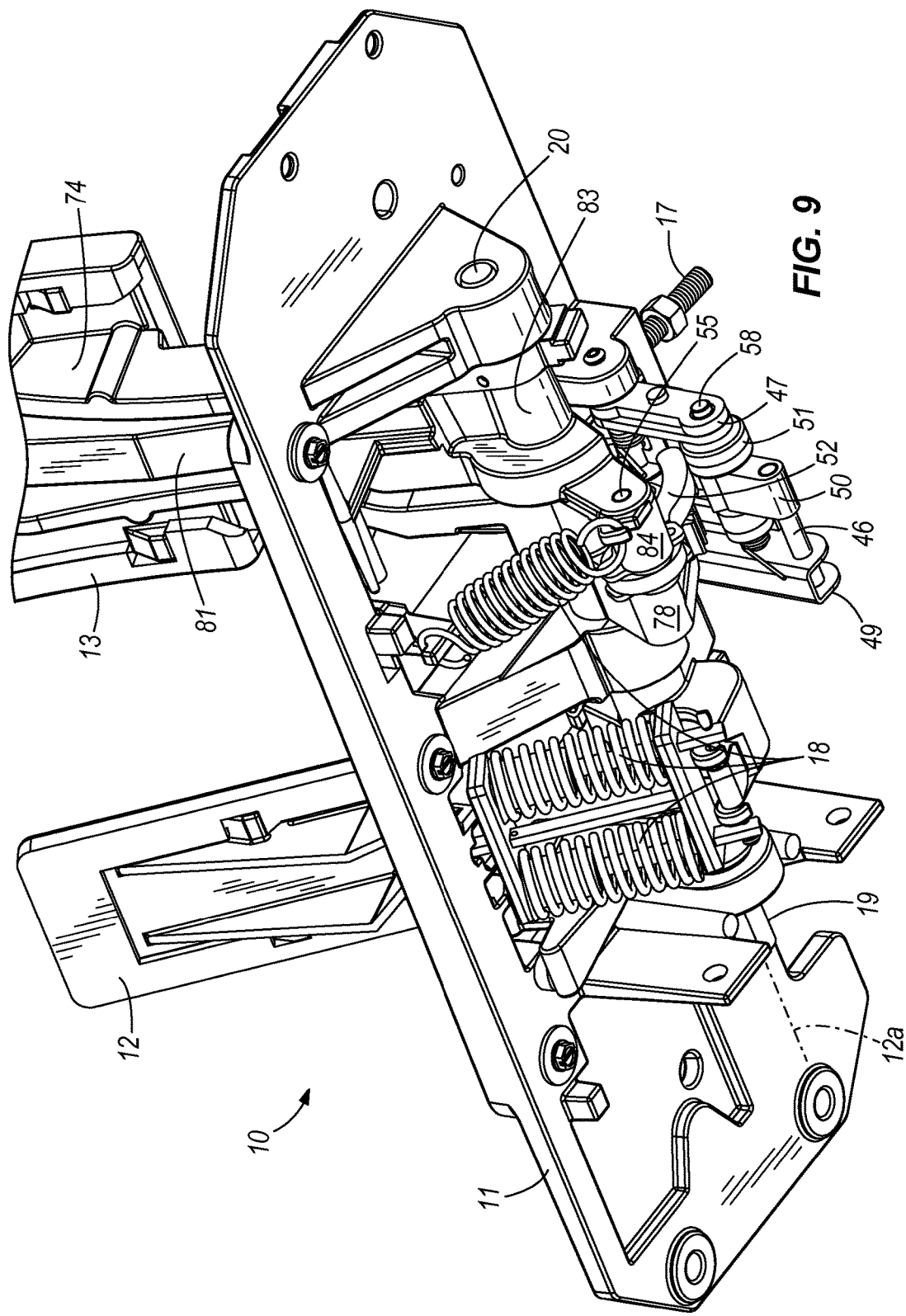
FIG. 9 is a partial perspective view of the modular pedal assembly illustrated in FIG. 5 with the control output regulator removed and showing several of components of the modular assembly, including the parking brake assembly.
Figure 10:
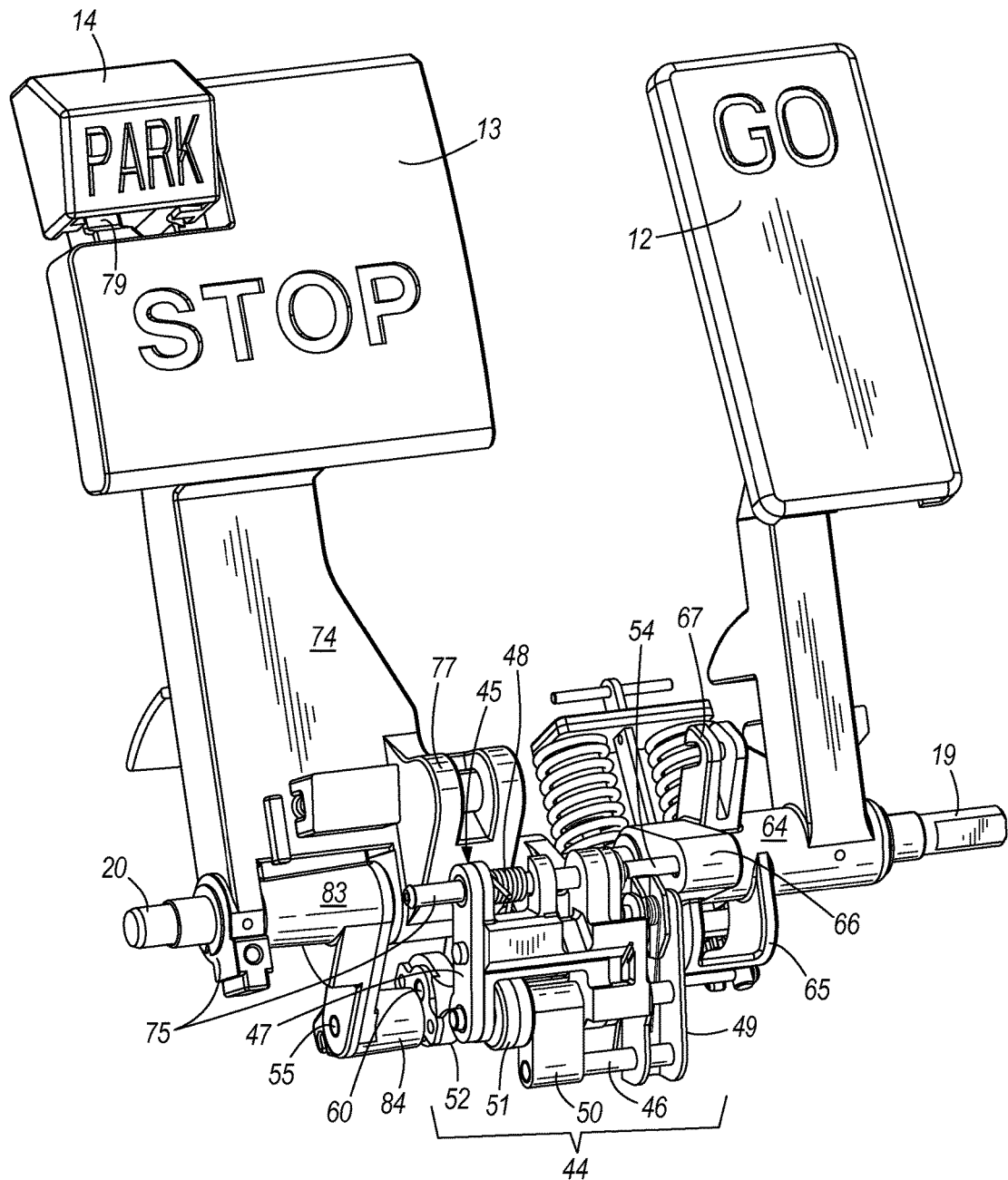
FIG. 10 is a perspective view of the modular pedal assembly illustrated in FIG. 5 removed from the base.
Figure 11:
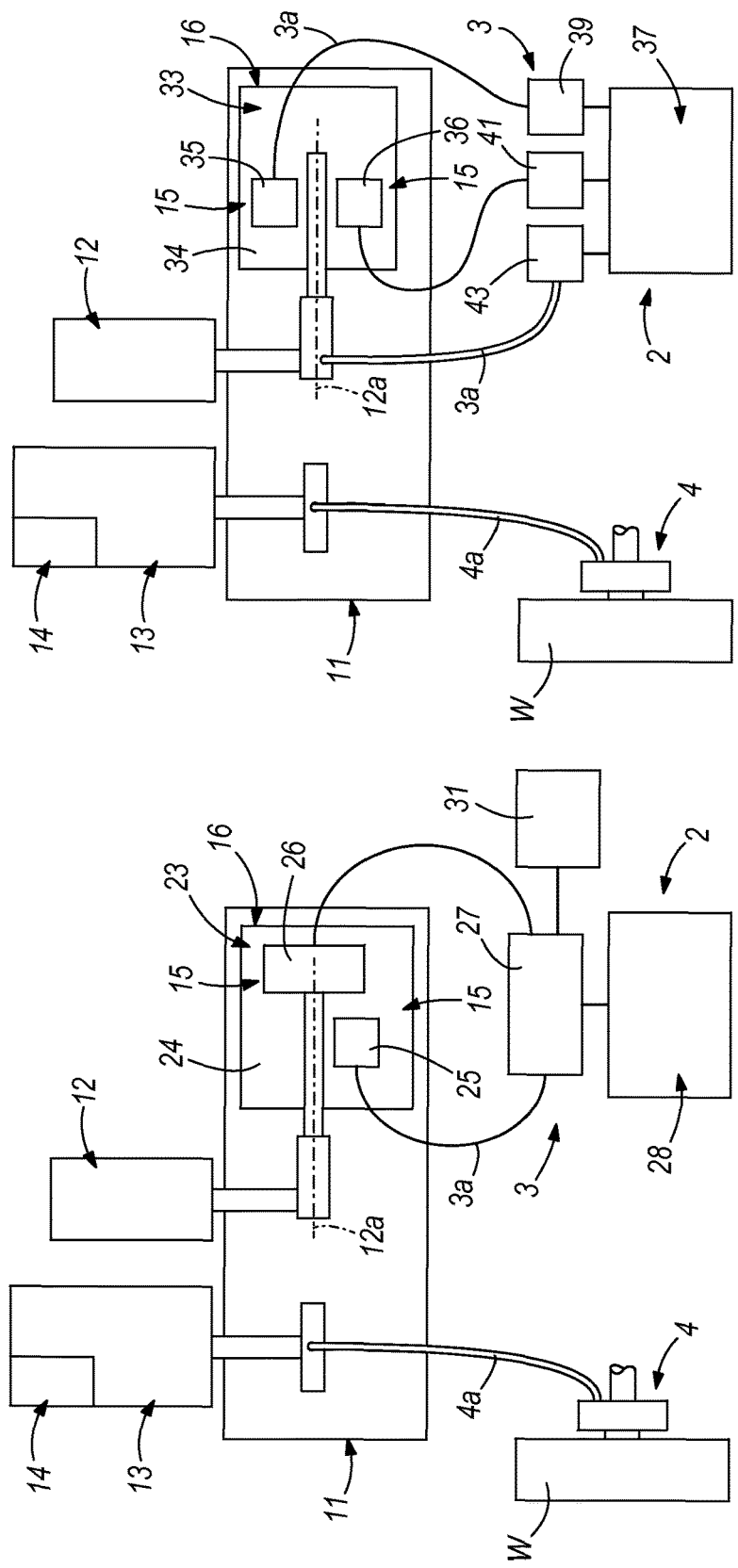
FIG. 11A is a more diagrammatic view of one embodiment of a control output regulator for use with a electric drive vehicle and components of the electric vehicle.
FIG. 11B is a more diagrammatic view of one embodiment of a control output regulator for use with a gas drive vehicle and components of the gas vehicle.

Referring to FIGS. 6-10 and 12, the illustrated accelerator pedal 12 has a shaft portion 64 that substantially surrounds and couples to the pivot 19. The pivot 19, as illustrated, is secured to the accelerator shaft 64 to rotate with the accelerator 12 when the accelerator 12 is actuated. Although not illustrated, the shaft 64 may be secured to the pivot by a fastener, a male/female connection, a force fit, a friction fit, adhesive, and the like. Furthermore, the accelerator pedal 12 does not need to be secured to the pivot 19 in all embodiments. For example, in some embodiments, the shaft portion 64 pivots with respect to the pivot 19 (structure not shown). Returning to the illustrated embodiment of the accelerator pedal assembly 12, portions of the pivot 19 are coupled to the base 11 via a bracket 40 on the base 11. Although not illustrated, these portions of the pivot 19 may rest in bearings mounted to the bracket 40. As best illustrated in FIGS. 9 and 10, a portion of the pivot 19 extends beyond the bracket 40. This portion of the pivot 19 rotates as the accelerator 12 is actuated. As will be discussed in greater detail below, this portion of the pivot 19 is coupled to a control output regulator 16.

Figure 6:
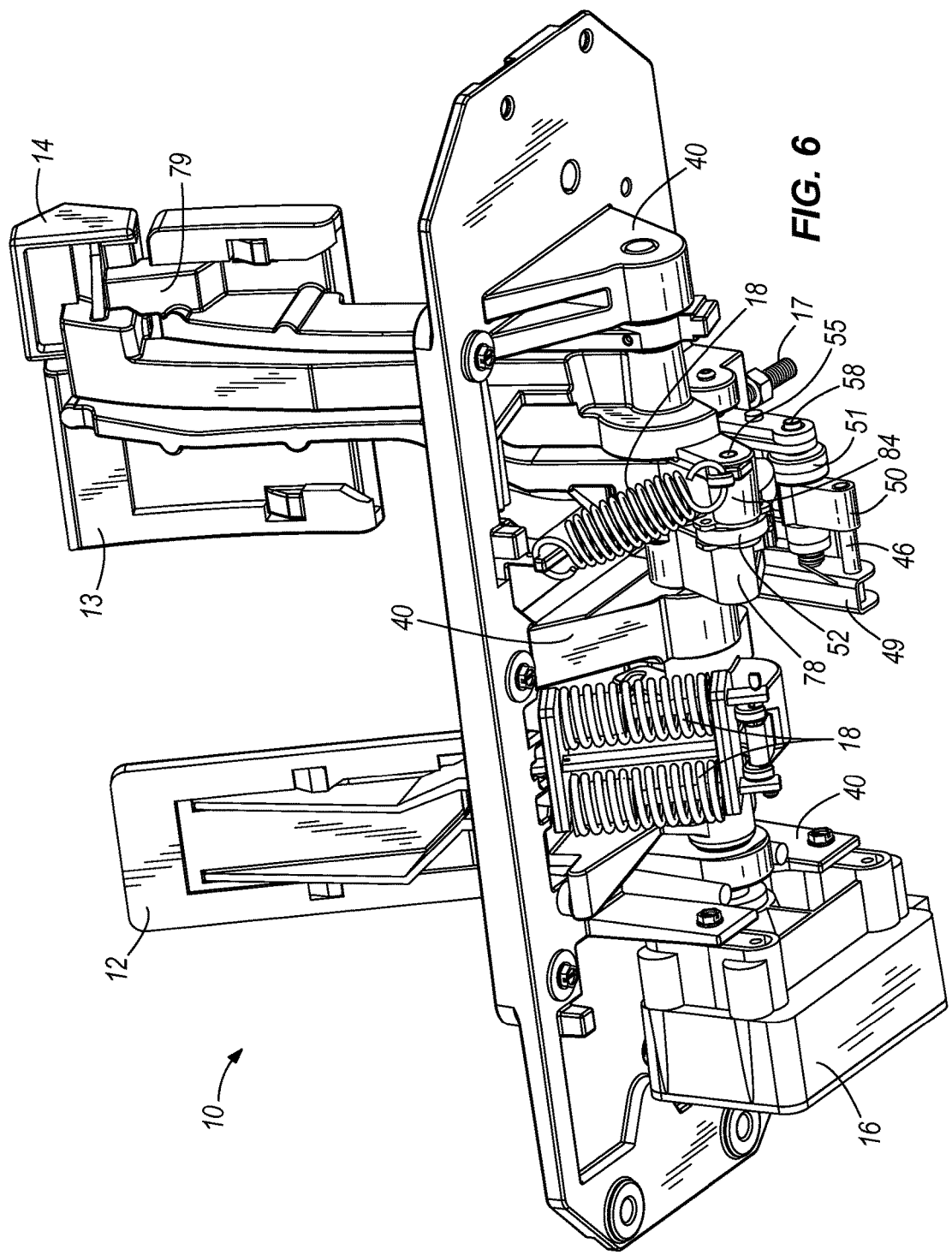
FIG. 6 is a perspective view of the modular pedal assembly illustrated in FIG. 5 showing the portions of the pedal assembly located under the base, including portions of the pedals and a control output regulator.

Another portion 65 of the accelerator 12 is coupled to one or more biasing members 18. In some embodiments, the biasing member also has a damper member. The biasing members 18 as illustrated in FIG. 6 are also coupled to the base 11. This structure allows the accelerator pedal 12 to be biased toward the initial or unactuated position $P_{A1}$. Thus, when the accelerator pedal 12 is actuated, the biasing members 18 exert a force against a portion 65 of the accelerator pedal 12 and create a torque on the pedal 12 to bias the pedal 12 toward the unactuated position.

The brake pedal assembly 13 is also coupled to a pivot 20. Much like the accelerator assembly 12, the pivot 20 of the brake pedal assembly 13 may either be rigidly fixed to the base 11 or may be fixed to the pedal assembly 13 and rotate within the base 11. If the pivot 20 is fixed to pedal assembly 13 and rotates relative to the base 11, a bearing may be mounted to the base 11 to reduce the force required to actuated the pedal 13 and to eliminate wear.

As best illustrated in FIGS. 5-10 and 14-16, the service brake pedal 13 and the parking brake pedal 14 are disposed adjacent to one another. Each pedal has an arm 74, 81 that extends from the foot actuated portion 73, 80 of the assembly 13, 14 to a shaft 75, 83. In the illustrated embodiment, the arm 81 of the parking brake pedal 14 is nested within the arm 74 of the service brake 13. As such, actuation of the service brake pedal 13 alone causes the parking brake pedal 14 to move with the service brake pedal 13 relative to the base 11, but not relative to the service brake pedal 13. The parking brake pedal 14, however, may be partially actuated with respect to the service brake pedal 13 and the base 11 without causing actuation of the service brake pedal 13. After a certain range of motion though, the parking brake pedal 14 hits an abutment 79 on the service brake pedal 13 causing the service brake pedal 13 to move with it. As will be discussed in greater detail below, further actuation of the parking brake pedal 14 (once it hits the abutment 79 on the service brake pedal 13) causes the service brake pedal 13 to actuate and the parking brake to engage.

Since the parking brake pedal 14 always moves upon actuation of the service brake pedal 13, a biasing member 18 may be coupled to the parking brake pedal 14 to bias both pedals 13, 14 toward the unactuated position. In other embodiments, it may be desirable to use a separate biasing member for each pedal. One or more portions 77 of the brake pedal assemblies 13, 14 may be coupled to one or more output members, such as output rod 17. These output members may be coupled to a braking system of a vehicle 1 once the modular pedal assembly 10 is mounted on the car 1.

Figure 7:
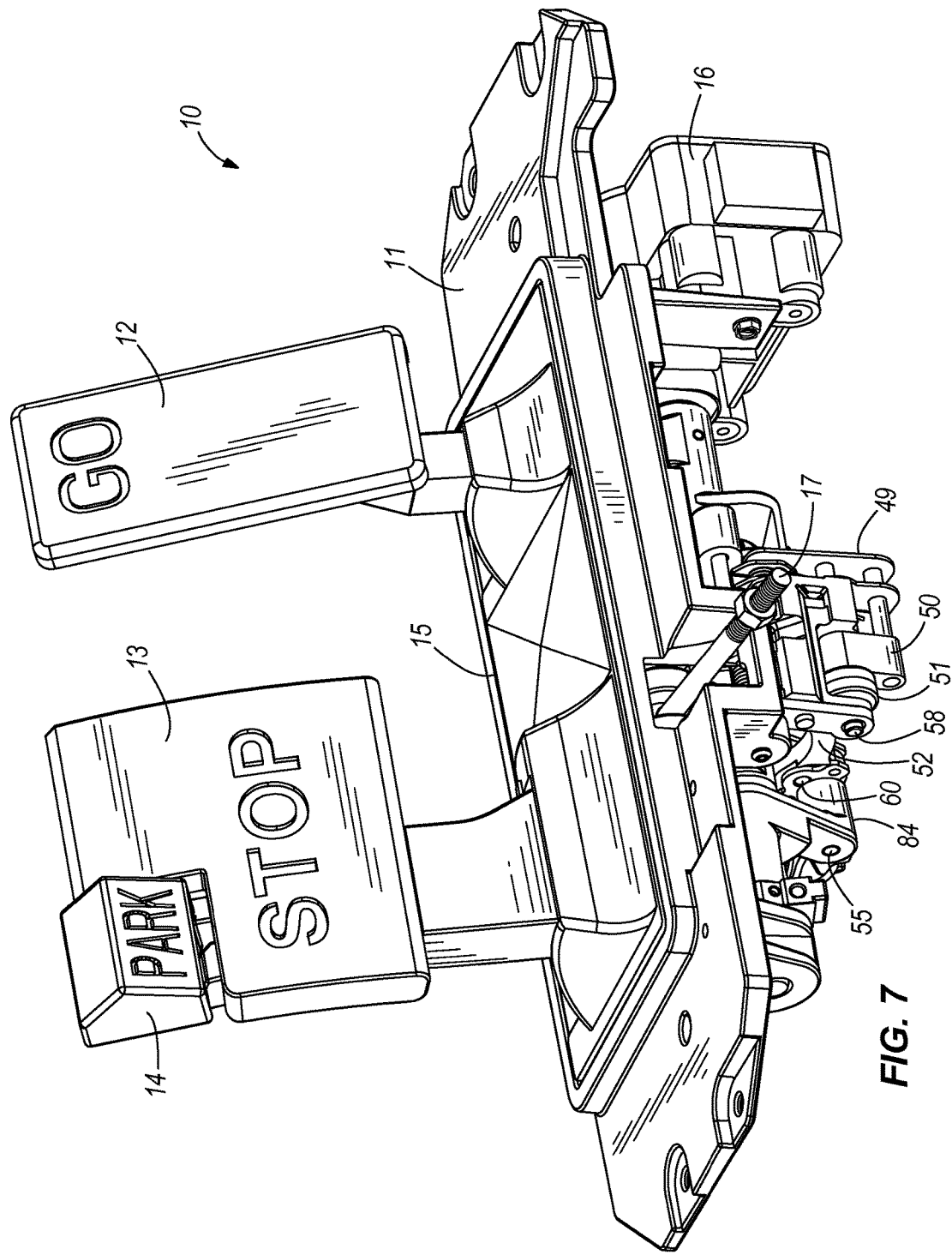
FIG. 7 is a perspective view of the modular pedal assembly illustrated in FIG. 5 showing some of the outputs of the modular pedal assembly.
Figure 8:
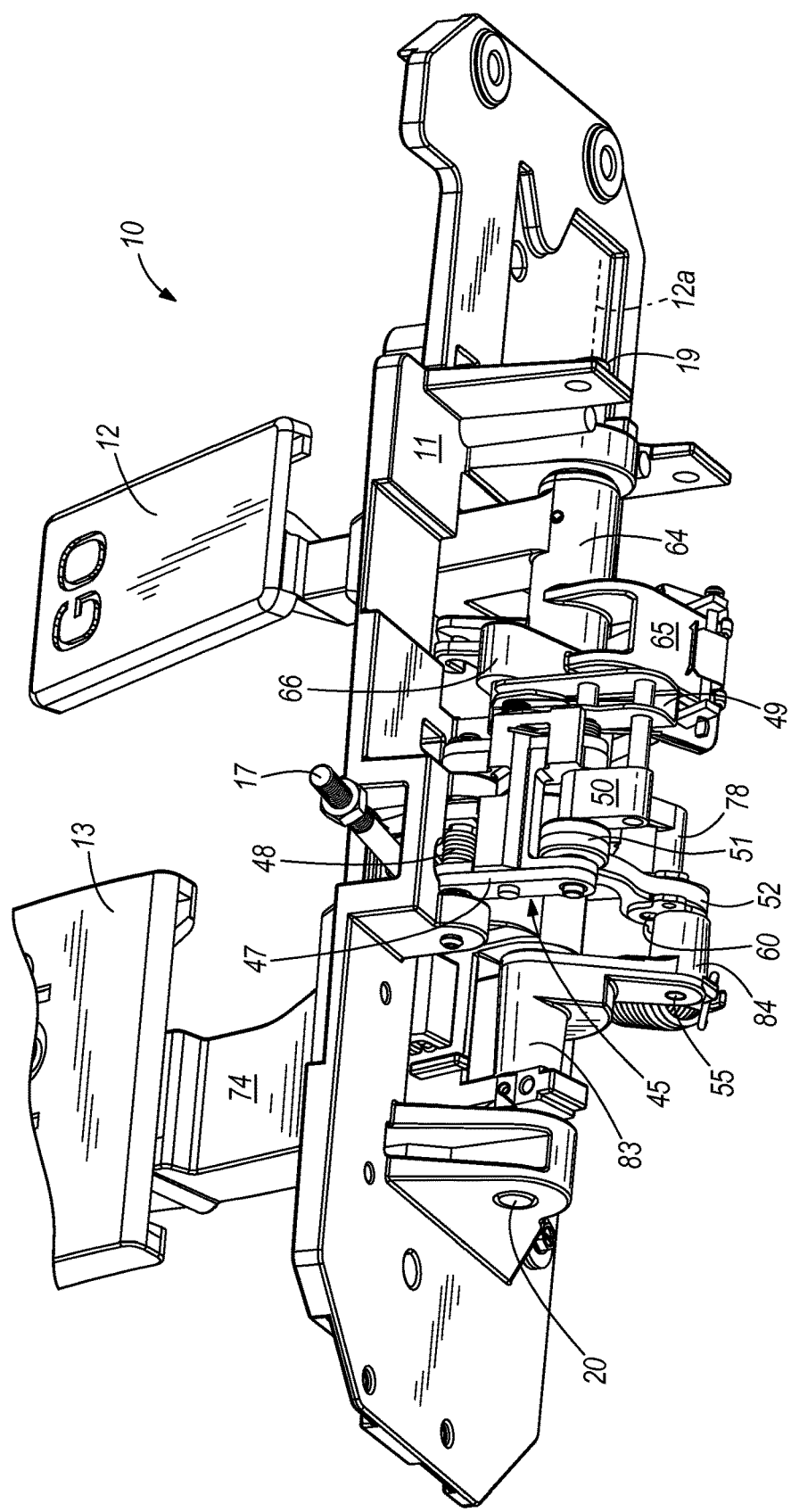
FIG. 8 is a partial perspective view of the modular pedal assembly illustrated in FIG. 5 with the control output regulator removed and showing several elements of the parking brake assembly.

As illustrated in FIGS. 5-7, a control output regulator 16 is preferably mounted to the base 11 of the pedal assembly 10. The control output regulator 16 is also coupled to the portion of the accelerator pedal assembly 12. The control output regulator 16 has a housing 24 or 34 that couples to the base 11 and supports at least one and preferably two sensors 15 disposed within the housing 24, 34, respectively. The sensors 15 are positioned within the housing 24 or 34 to sense actuation of the accelerator pedal 12. Since a portion of the accelerator pivot 19 extends within the housing 24 or 34 of the control output regulator 16, the sensors 15 preferably detect rotation of the pivot 19. The control output regulator 16 communicates with the drive system of the vehicle 1 indicating whether the accelerator pedal 12 is actuated. In some embodiments, the control output regulator 16 also communicates with the drive system the amount of angular displacement $d_A$ by which the accelerator pedal 12 is actuated or displaced.

As discussed above, the modular pedal assembly 10 may be used on a vehicle 1 having either an electric drive system or gas drive system with only minimal modifications. The base 11 and pedals may be identical for both electric drive and gas drive vehicles 1. Vehicles 1 having an electric drive system utilize a motor control output regulator 23, while gas drive systems utilize a gas control output regulator 33. The motor control output regulator 23 and the gas control output regulator 33 are generally similarly constructed, such that either regulator 23, 33 may be connected with the remaining components of the modular pedal assembly 10, which are generally identical in both constructions. Thus, the modular pedal assembly 10 described embodiment requires very minor modifications and relatively few alternative parts to adapt for use with either electric or gas motors 2. As will be discussed below, the main difference between the different types of control output regulators is the type of sensors 25, 26, 35, 36 utilized within the housing 24, 34.

As discussed above, the motor control output regulator 23 is used with a vehicle 1 having an electric drive system including an electric motor 28, a battery 31 and a controller 27. The motor control output regulator 23 has a housing 24 that is adapted to couple with the base 11. The housing 24 also receives a portion of the accelerator pivot 19 and houses at least one and preferably two sensors 15. In the embodiment illustrated in FIG. 11A, two sensors 25, 26 are contained within the housing 24. The first sensor 25 is a limit switch, which senses actuation of the accelerator pedal 12 and is operatively coupled with the controller 25 such that the controller 27 is "turned-on" when the pedal 12 displaces from the initial position $P_{A1}$. Once the limit switch 25 senses actuation of the accelerator pedal 12 from the at rest, unactuated state, it sends a signal to a controller 27. Upon receiving a signal from the motor control output regulator 23, the controller 27 is "turned-on" and enabled to send a signal to the motor 28. If the controller 27 does not receive a signal from the limit switch 25, the controller 27 is in an off state and thus unable to send a signal to the electric motor 28.

The illustrated motor control output regulator 23 also has a second sensor 26 within the housing 24. The second sensor is preferably a variable resistor or potentiometer, which senses the amount of actuation or angular displacement $d_A$ of the accelerator pedal 12. The second sensor 26 also communicates with the controller 27 and is preferably configured to generate and transmit a variable signal to the controller 27 that is generally proportional to the angular displacement $d_A$ (FIG. 29) of the accelerator pedal 12.

For example, in one embodiment where the second sensor 26 is a variable resistor such as a potentiometer, the potentiometer 29 preferably sends a variable voltage to the controller 27 to indicate the amount that the accelerator 12 is actuated. In one particular embodiment, for example, the potentiometer 29 may be designed to send zero (0) volts to the controller 27 when the accelerator pedal 12 is in the unactuated, at rest state (i.e., located at the initial position $P_{A1}$) and up to five (5) volts when the accelerator pedal 12 is in the fully actuated state, i.e., located at the maximum travel position $P_{A2}$. If, however, the accelerator pedal 12 is actuated halfway between the at rest, unactuated state and the fully actuated state, the potentiometer 29 sends a signal having a magnitude of around two and one-half (2½) volts to the controller 27. As illustrated, the voltage sent to the controller 27 varies with the angular displacement $d_A$ or position of the accelerator pedal 12. Once the controller 27 receives both signals from the sensors 25, 26, it may then send a signal to the motor 28 of the vehicle 1. The signal may be a variable signal, such as pulse-width-modulation or the like. Upon receiving the signal from controller 27, the motor 28 may then accelerate or decelerate corresponding to the amount the accelerator pedal 12 is actuated.

As previously mentioned, the gas control output regulator 33 is preferably constructed generally similarly as the electric control output regulator 23. As such, either control output regulator 23, 33 may be mounted to the base 11 of a stock modular pedal assembly 10 depending upon the type of drive system utilized. The gas control output regulator 33 has a housing 34 that is adapted to be received upon the base 11. The housing also contains one or more sensors 35, 36 to sense the position of the accelerator pedal 12.

As discussed above, the embodiment of the gas control output regulator 33 illustrated in FIG. 11B contains two limit switches 35, 36. The first limit switch 35 is part of a control circuit 3 that includes a starter circuit with a solenoid 39 operatively coupled with the starter motor of the engine 37. The first limit switch 35 is a normally open state when the accelerator pedal 12 is in the at rest, unactuated state (i.e., located at the initial position $P_{A1}$). Since the first limit switch 35 is in a normally open state, the first circuit has a normally open condition. However, upon actuation of the accelerator pedal 12, the first sensor 35 closes the circuit and sends a signal to the solenoid 39 to enable the engine 37 to start idling. The accelerator pedal 12 also has an output member, such as a throttle cable 43a connected with the carburetor 43 of the engine 37, to directly control the amount of acceleration and deceleration of the vehicle 1 corresponding to the amount the accelerator 12 is actuated.

The second limit switch 36 is preferably housed within the gas control output regulator 33 as illustrated. The second switch 36 is electrically connected with the magneto 41 connected with the spark plug(s) of the engine 37. The second switch 36 has a normally closed state when the accelerator pedal 12 is in the at rest, unactuated state (i.e., located at the initial position $P_{A1}$). When the switch 36 is in the closed state, it grounds the magneto 41 and kills the spark to the spark plugs. As such, the engine 37 does not idle when the accelerator pedal 12 is at rest, unactuated state. However, upon actuation of the accelerator pedal 12, the second switch 36 opens the portion of the control circuit 3 containing the magneto 41. With the second switch 36 open, the magneto 41 is no longer grounded and the spark plugs may generate a spark. Thus, the engine 37 may idle and drive the vehicle 1 depending upon the amount of actuation of the accelerator pedal 12.

Another independent aspect of the present invention is a parking brake assembly. Although this assembly is shown in many of the figures, it is best illustrated in FIGS. 10 and 12-27. As is well know in the vehicle industry, the parking brake may keep the vehicle 1 from rolling with respect to the ground. In the present embodiment, the parking brake is engageable upon actuation of the parking brake pedal 14 with respect to the service brake pedal 13. As previously described, the parking brake pedal 14 may be actuated independently of the service brake pedal 13 through a limited range of motion. However, after a the limited range of motion, further actuation of the parking brake pedal 14 may cause actuation of the service brake pedal 13 due to contact between the parking brake pedal 14 and an abutment 79 on the service brake pedal 13. It is the actuation of the service brake pedal 13 while the parking brake pedal 14 is actuated relative to the service brake pedal 13 that causes the parking brake to engage. Once the parking brake is engaged, actuation of the accelerator pedal 12 may cause disengagement of the parking brake.

The parking brake illustrated comprises a parking brake engagement assembly 44 including a carriage 45 coupled to the base 11 and an engagement element or pawl 50 coupled to the carriage 45. The illustrated carriage 45 comprises a plurality of rods 46 and one or more brackets 47 interconnecting the rods 46. One of the rods 46 that couples the carriage 45 to the base 11 defines a first pivot point 57 for the carriage 45. The entire carriage 45 is pivotable about this point with respect to the base 11. The engagement element 50 is pivotally coupled to another rod 46 defining a second pivot point 58. This rod 46 defining the second pivot point 58 is also coupled to a lever 49. The lever 49 is adjacent to the carriage 45 and capable of pivoting independently of the carriage 45 about the second pivot point 58. As will be described in greater detail below, pivotal movement of the lever 49 with respect to carriage 45 may cause the engagement element 50 to pivot about the second pivot point 58.

The carriage 45, as illustrated in FIG. 10, is biased by a spring 48 toward the brake pedal assembly 13. The parking brake engagement assembly 44 also comprises a toothed portion or gear 53 coupled to the brake pedal assembly 13 and an arm 52 coupled to the brake pedal assembly 13. The toothed portion 53 of the brake pedal assembly 13 is designed to selectively engage the engagement element 50 on the carriage 45 in the engaged state of the parking brake. The toothed portion 53 and the engagement element 50 may be designed to resist disengagement, as illustrated, to prevent unintentional disengagement of the parking brake. Thus, when the engagement element 50 is engaged with the toothed portion 53 of the brake pedal assembly 13, the parking brake is engaged or "on." However, if the engagement element 50 is not engaged with the toothed portion 53 of the brake assembly 13 the parking brake is not on.

The carriage 45 (which includes the engagement element 50) is biased towards the brake pedal assembly 13, 14 (which includes the toothed portion 53). Thus, without an apparatus to keep the engagement element 50 separate from the toothed portion 53, the engagement element 50 would engage the toothed portion 53 upon actuation of the service brake pedal 13 during normal driving conditions and unintentionally engage the parking brake. Therefore, a moveable arm 52 is coupled to the brake pedal assembly 13, 14 to control the position of the engagement element 50 with respect to the toothed portion 53 and prevent unintentional engagement.

The arm 52 has a first position that prevents engagement of the engagement element 50 with the toothed portion 53 and a second position which allows engagement between the engagement element 50 and toothed portion 53. In the first position, the arm 52 allows actuation of the service brake pedal 13 without the parking brake engaging. In the second position of the arm 52, however, engagement between the engagement element 50 and the toothed portion 53 during actuation of the service brake pedal 13 is enabled. The position of the arm 52 is controlled by the parking brake pedal 14. The arm 52 stays in the first position to prevent engagement of the parking brake while the parking brake pedal 14 is not sufficiently actuated with respect to the service brake pedal 13. Sufficient actuation of the parking brake pedal 14 with respect to the service brake pedal 14 places the arm 52 in the second position and enables engagement of the parking brake. Movement of the arm 52 is caused by the relative motion between the pedals 13, 14. The relative motion of the parking brake pedal 13 with respect to the service brake pedal 14 causes a torque on the arm 52. In the illustrated embodiment, the arm 52 is coupled to the service brake pedal 13 by a first pin 60 and coupled to the parking brake pedal 14 by a second pin 55. Thus the relative motion between the two pedals 13, 14 causes a torque on the arm 52.

In some embodiments, the arm 52 has a cammed surface on it and the carriage has a roller 51 adjacent the engagement element 50. Thus, the roller 51 rides on the cammed surface in the first position of the arm 52 and the parking brake is prevented from engaging. The roller 51 does not sufficiently engage the cam surface of the arm 52 in the second position of the arm 52 to prevent the parking brake from engaging.

Figure 12:
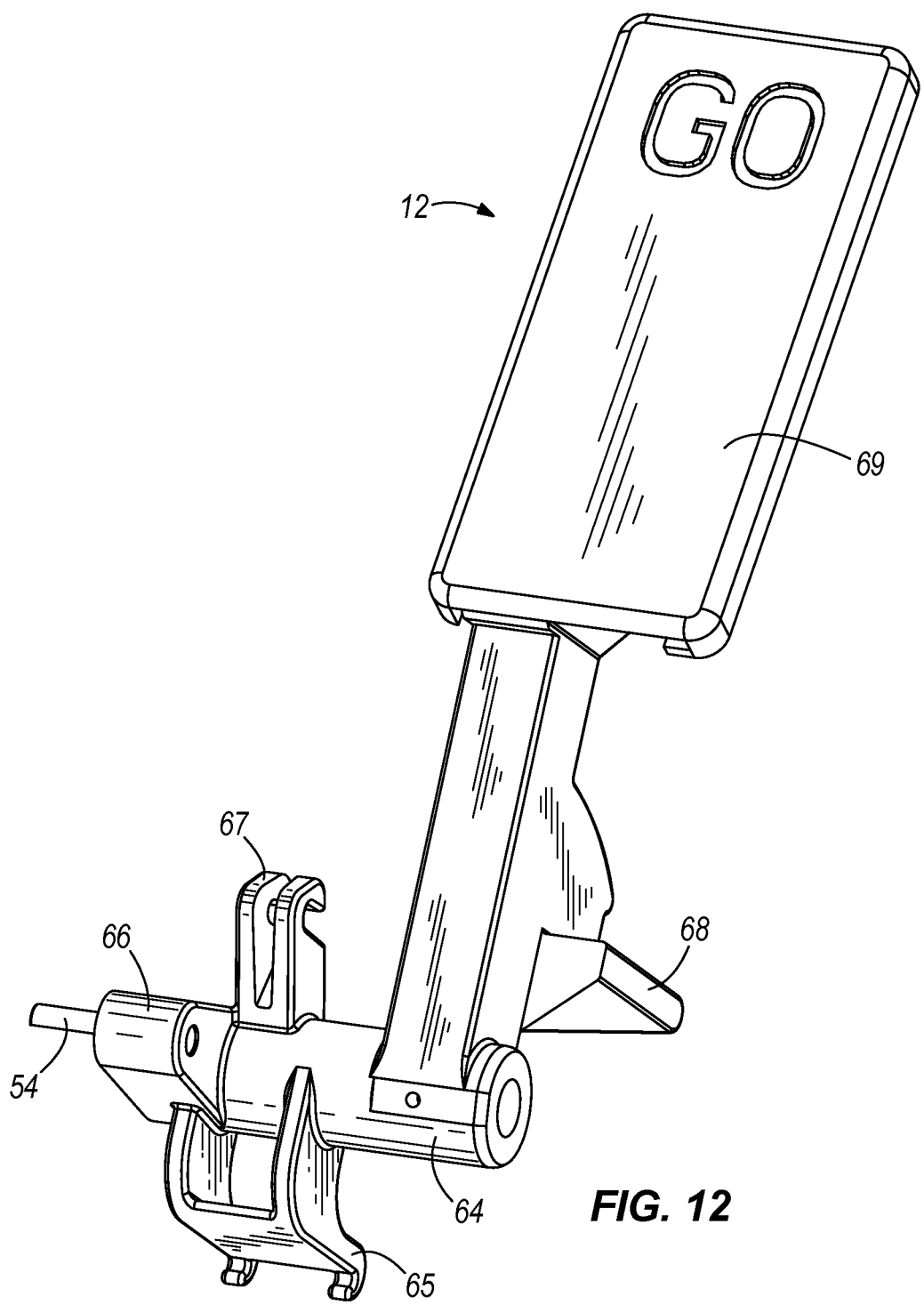
FIG. 12 is a perspective view of the accelerator pedal assembly, including a pedal, a shaft, a pin, an output portion, and a biased portion.
Figure 13A:
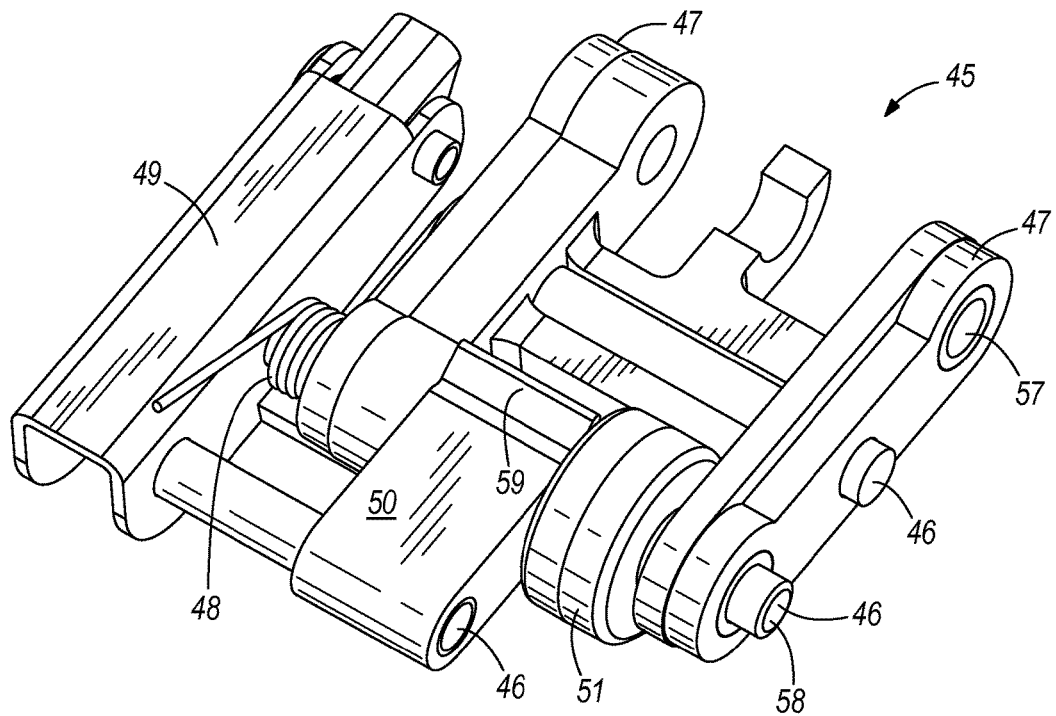
FIG. 13A is a perspective view of a portion of the parking brake engagement assembly, including a carriage, a lever, a roller, and an engagement element having a projection.
Figure 13B:
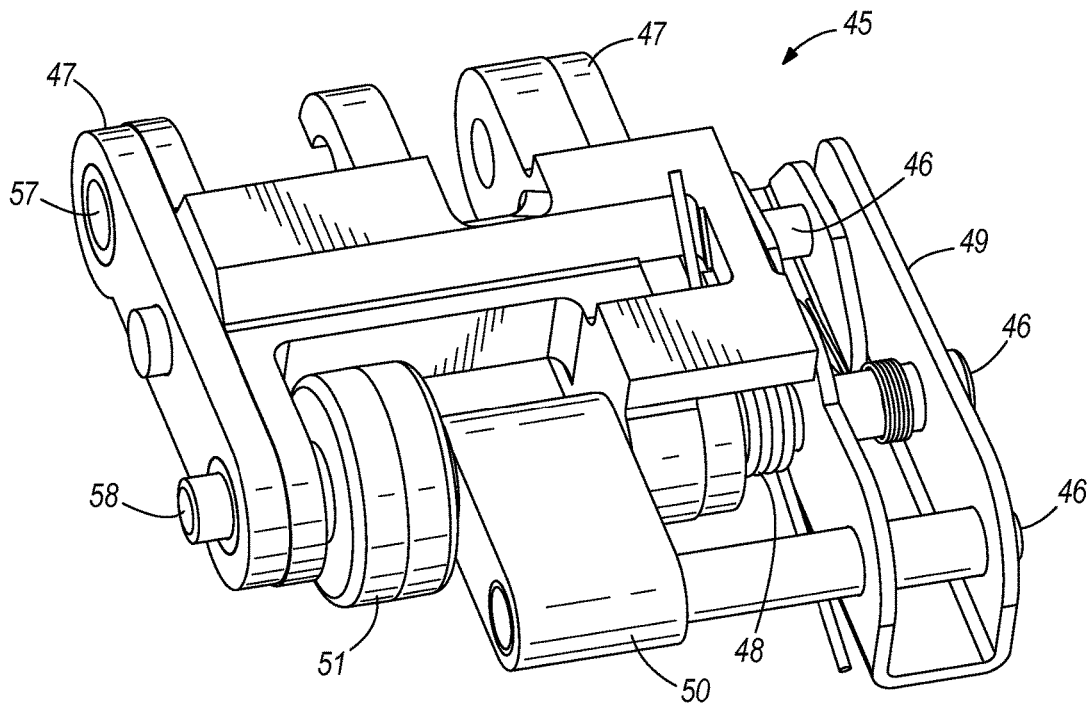
FIG. 13B is a perspective view from a different angle of the portion of the parking brake engagement assembly illustrated in FIG. 13A.
Figure 14:
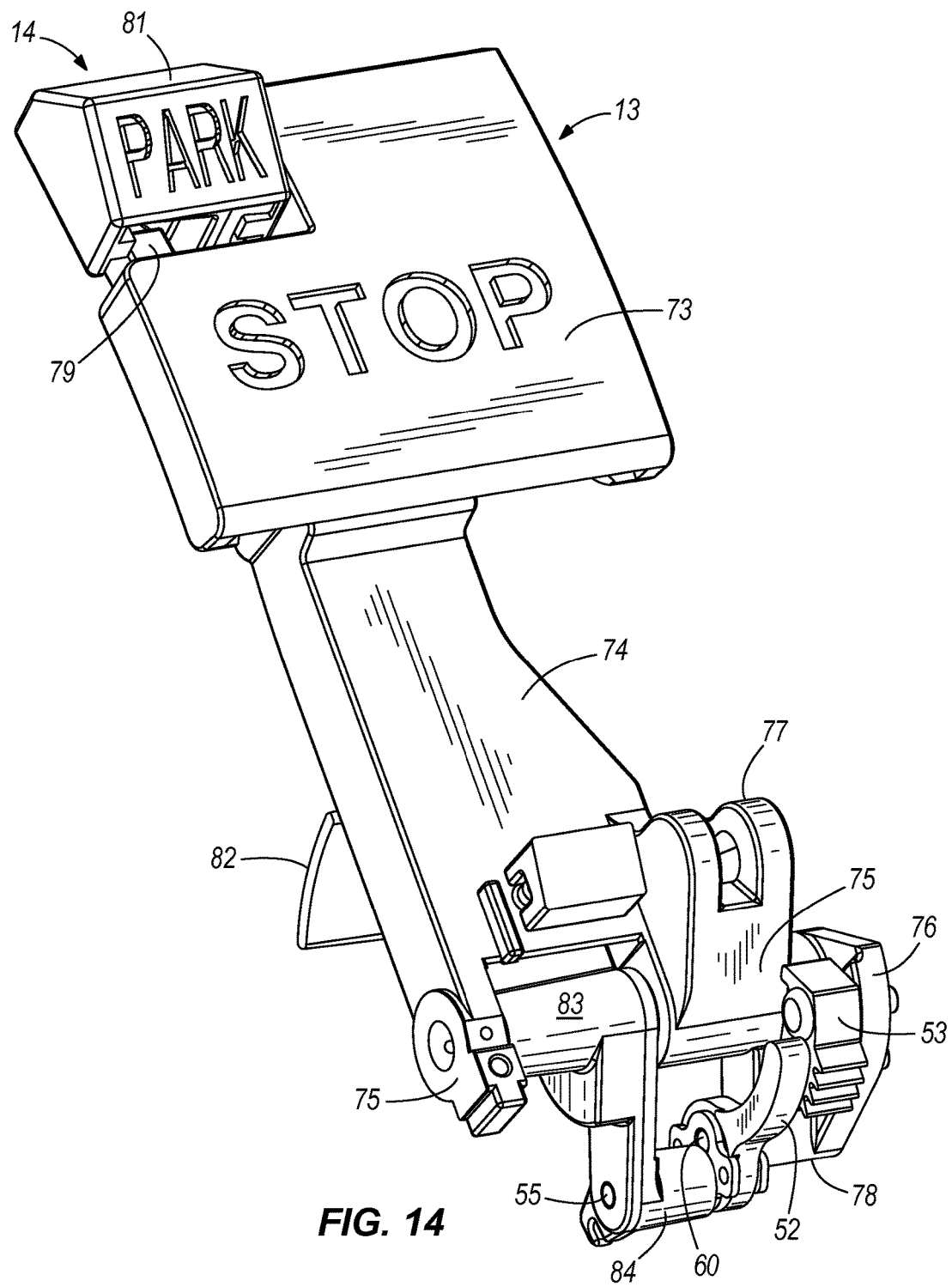
FIG. 14 is a perspective view of the brake pedal assembly illustrated in FIG. 10, including the service brake pedal having a toothed portion and an output portion, the parking brake pedal, and an arm.
Figure 15:
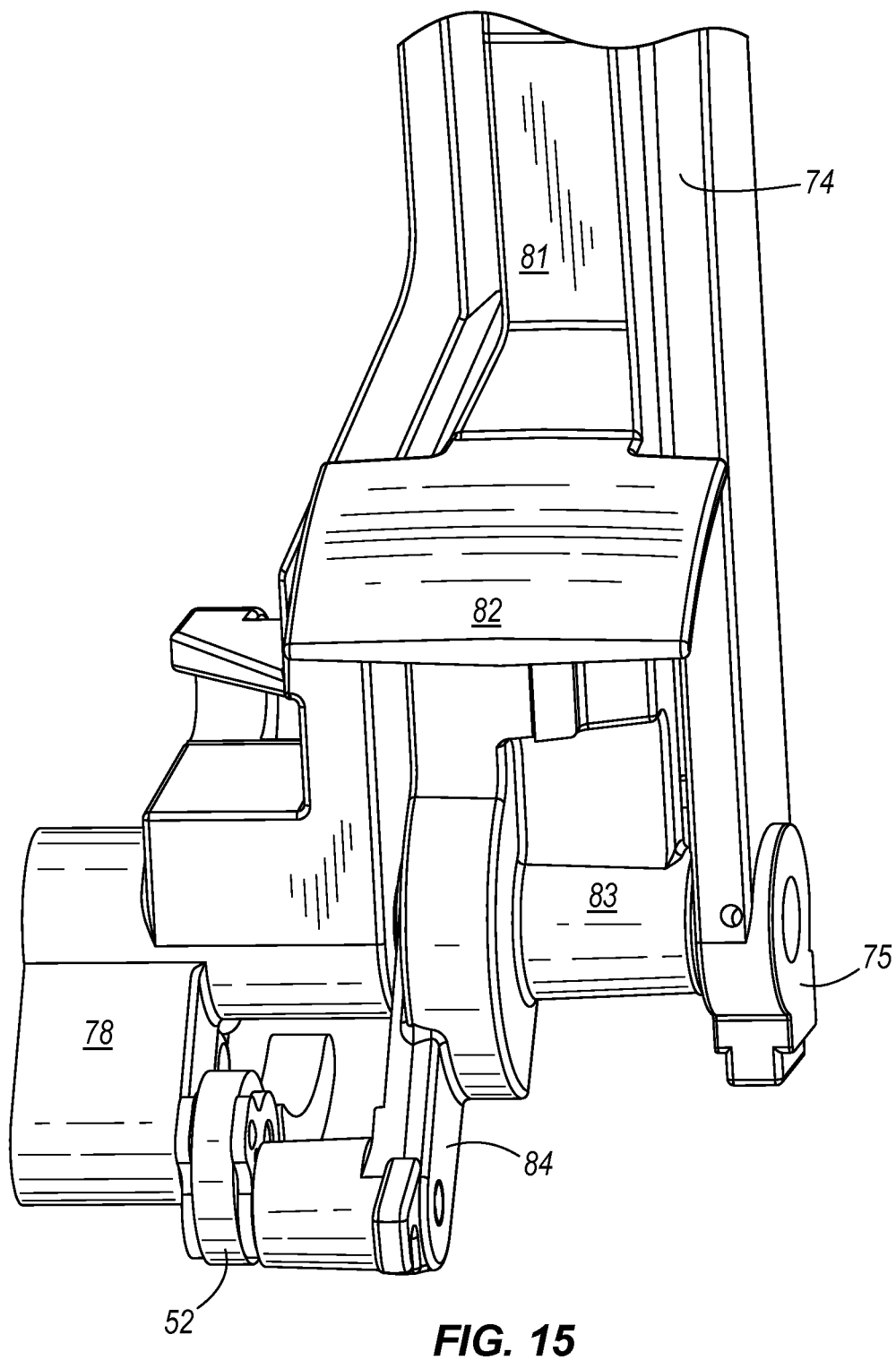
FIG. 15 is a partial perspective view of the reverse side of the brake pedal assembly illustrated in FIG. 14 showing the parking brake pedal nested within a portion of the service brake pedal and interconnected to the service brake pedal.
Figure 16:
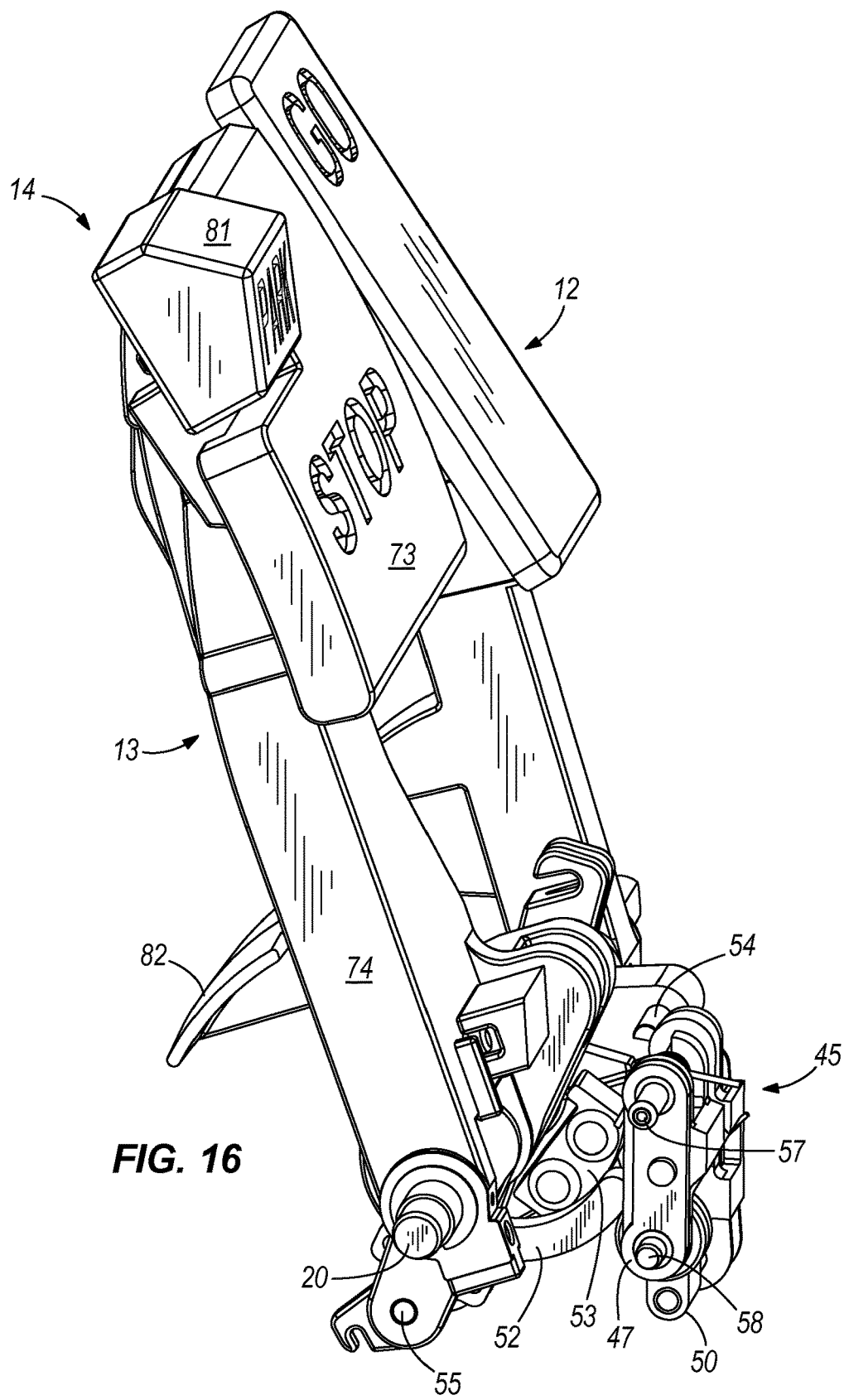
FIG. 16 is a partial perspective view of the pedal assembly illustrated in FIG. 10 showing the pedals in the unactuated state and the parking brake in the disengaged.
Figure 17:
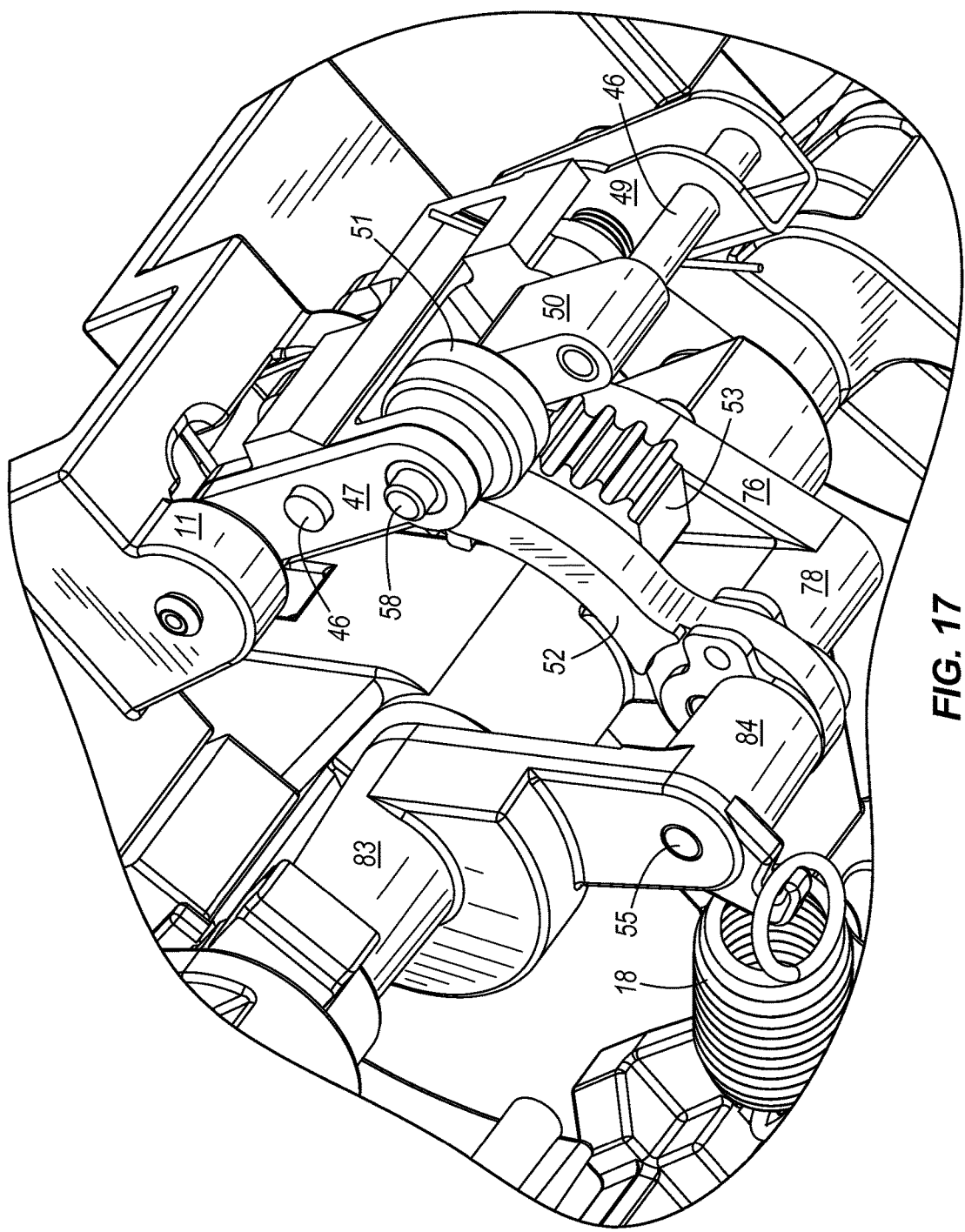
FIG. 17 is a partial perspective view of the pedal assembly illustrated in FIG. 16 showing arm coupled to the brake pedal assembly preventing the parking brake engagement assembly from engaging the toothed portion of the brake pedal assembly.
Figure 18:
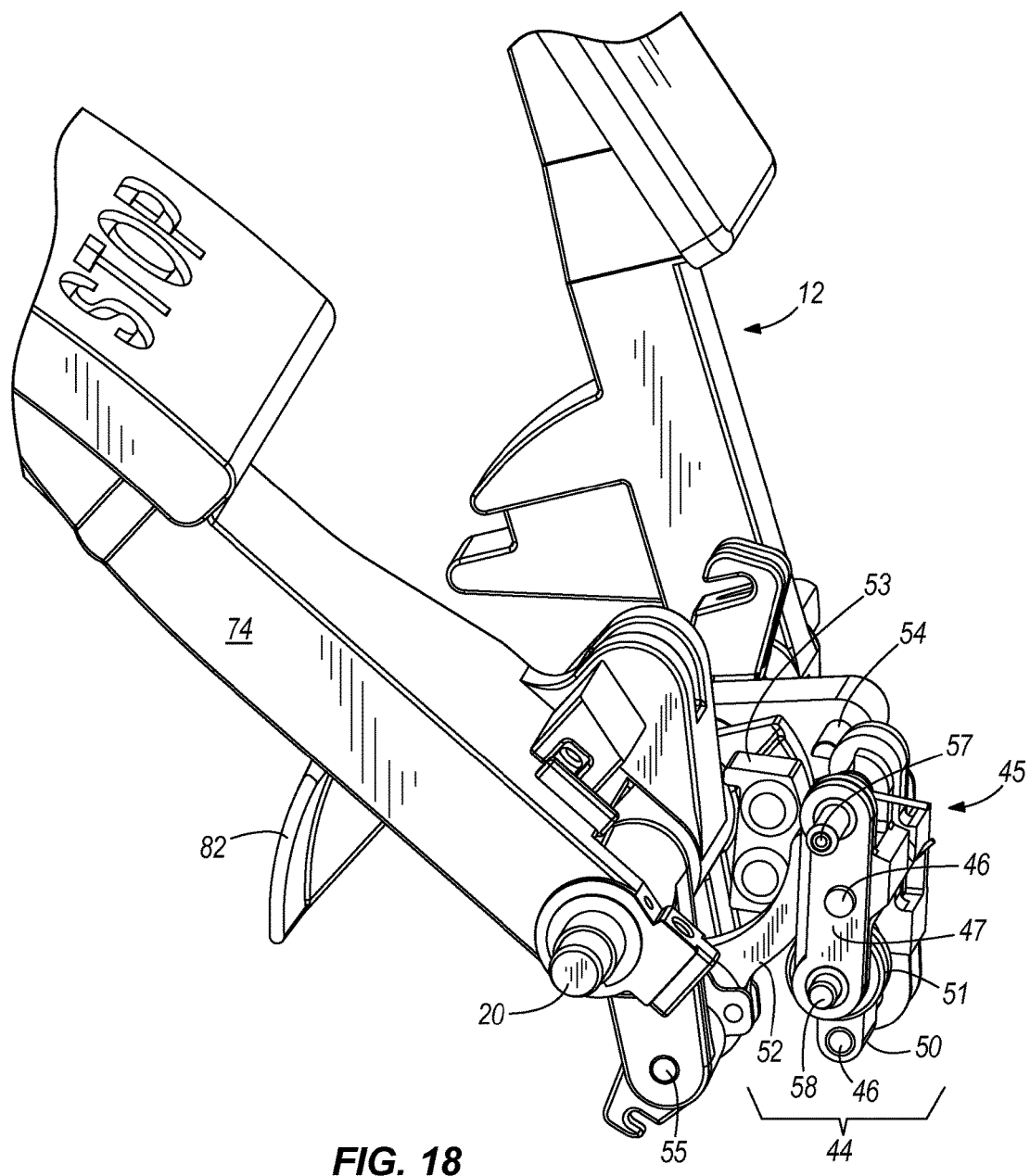
FIG. 18 is a partial perspective view of the pedal assembly illustrated in FIG. 10 showing the service brake pedal in the actuated state and the parking brake engagement assembly held in the disengaged position by the arm.
Figure 19:
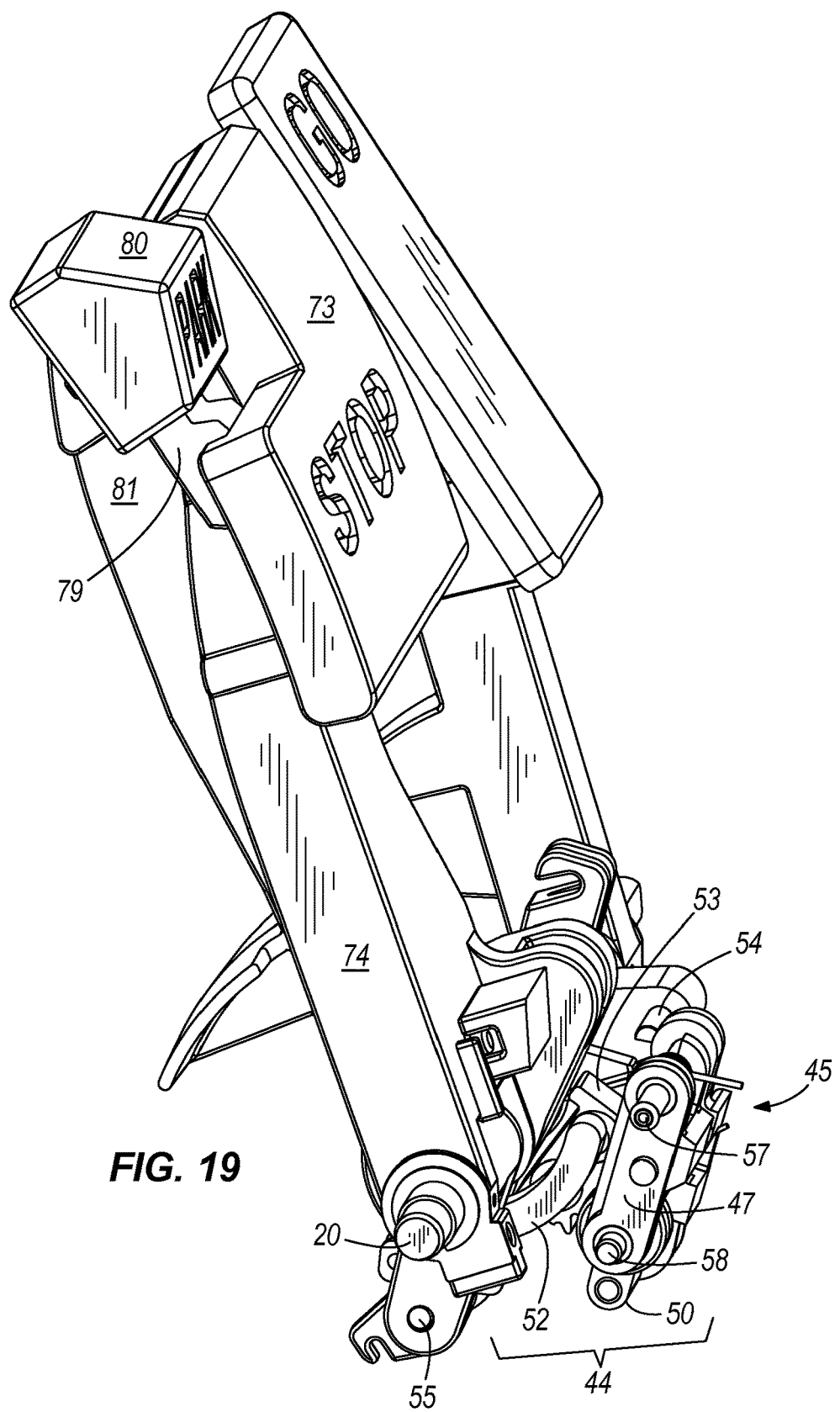
FIG. 19 is a partial perspective view of the pedal assembly illustrated in FIG. 10 showing the parking brake pedal in the actuated state with respect to the service brake pedal and the arm rotated, allowing the parking brake engagement assembly to abut the toothed portion.
Figure 20:
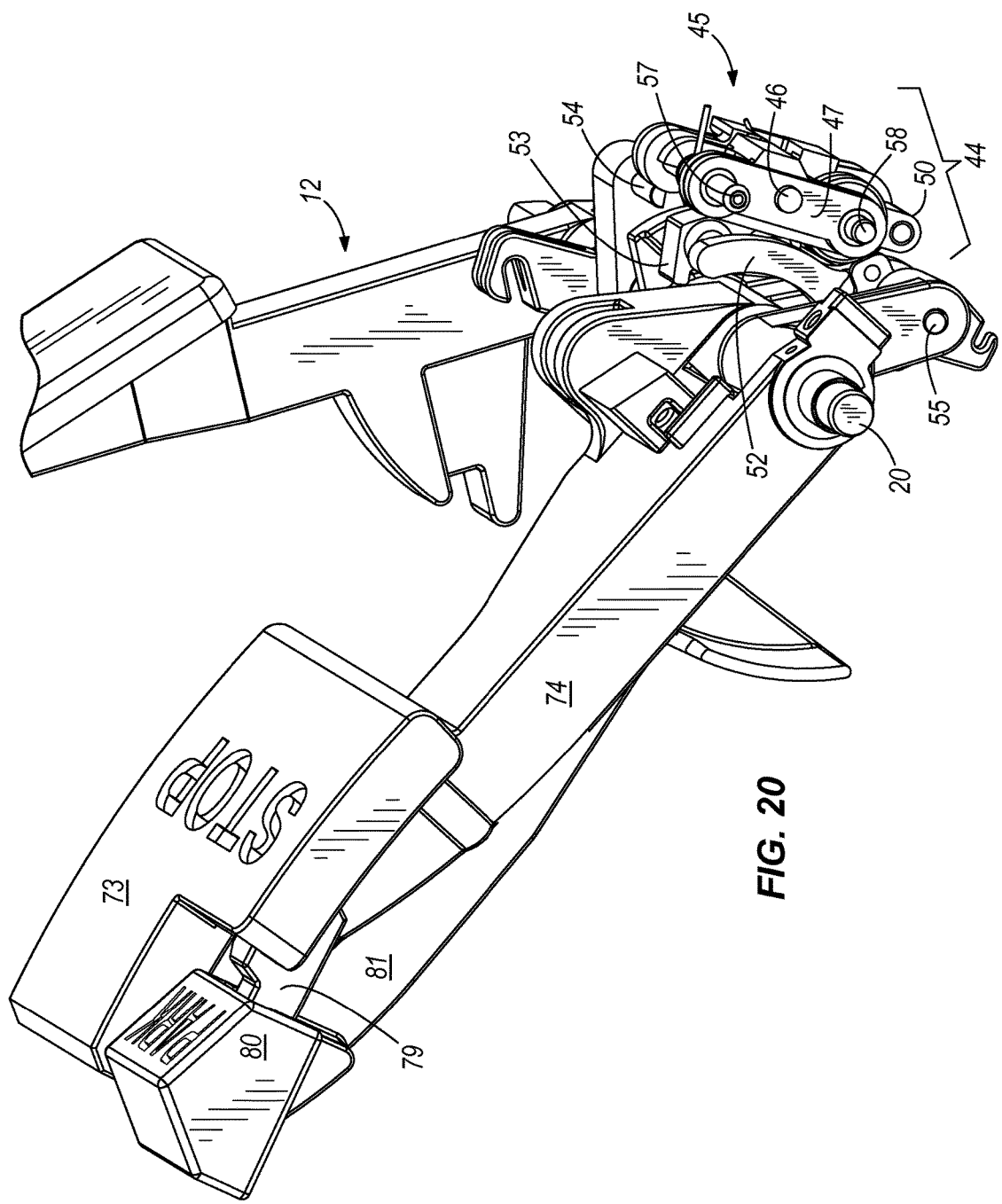
FIG. 20 is a partial perspective view of the pedal assembly illustrated in FIG. 10 showing the service brake pedal actuated and the parking brake pedal in the actuated with respect to the service brake pedal, placing the pedal assembly in the parked state.
Figure 21:
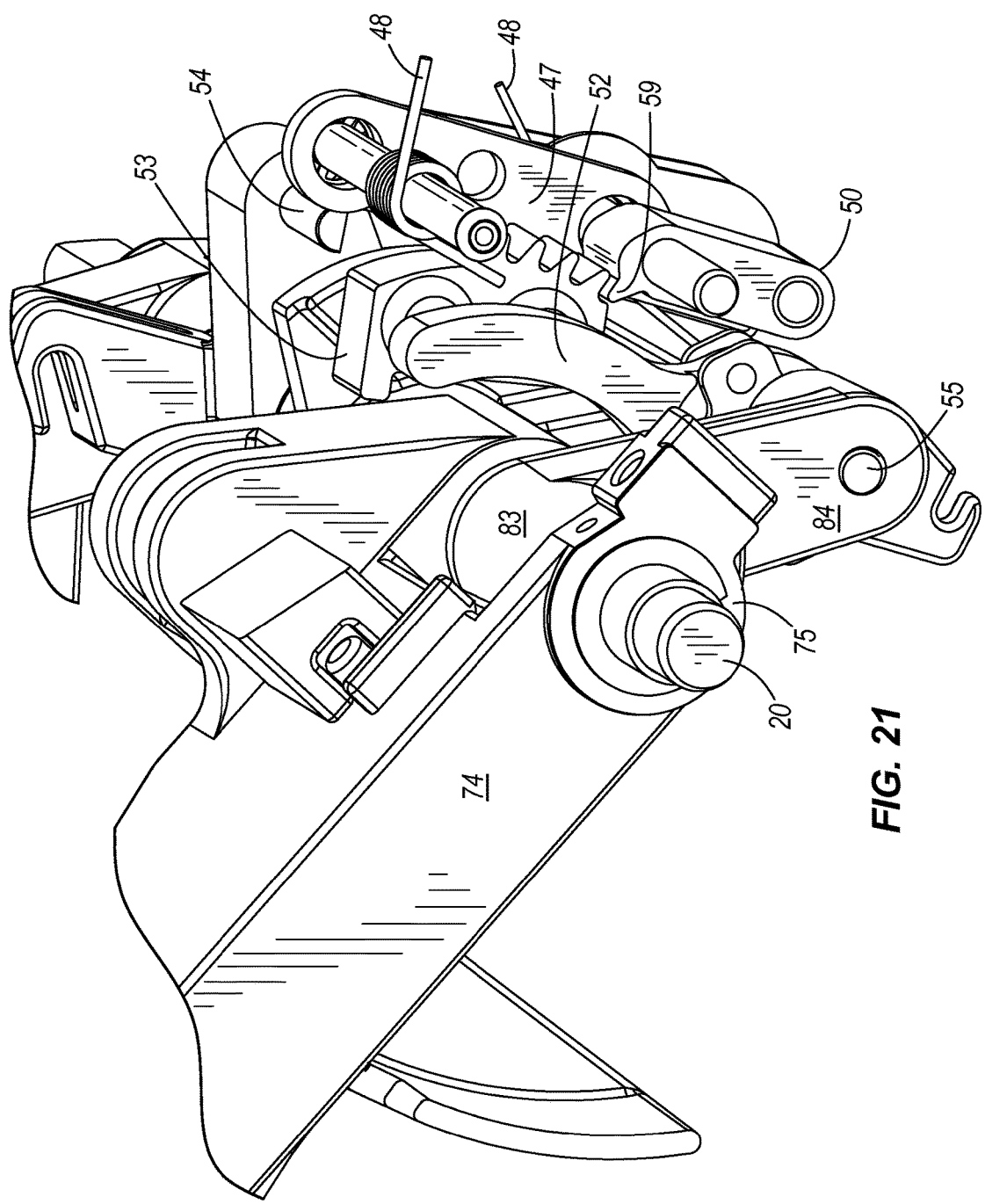
FIG. 21 is a partial perspective view of FIG. 20 showing the arm rotated and the projection of the engagement element engaged with the toothed portion of the service brake pedal assembly.
Figure 22:
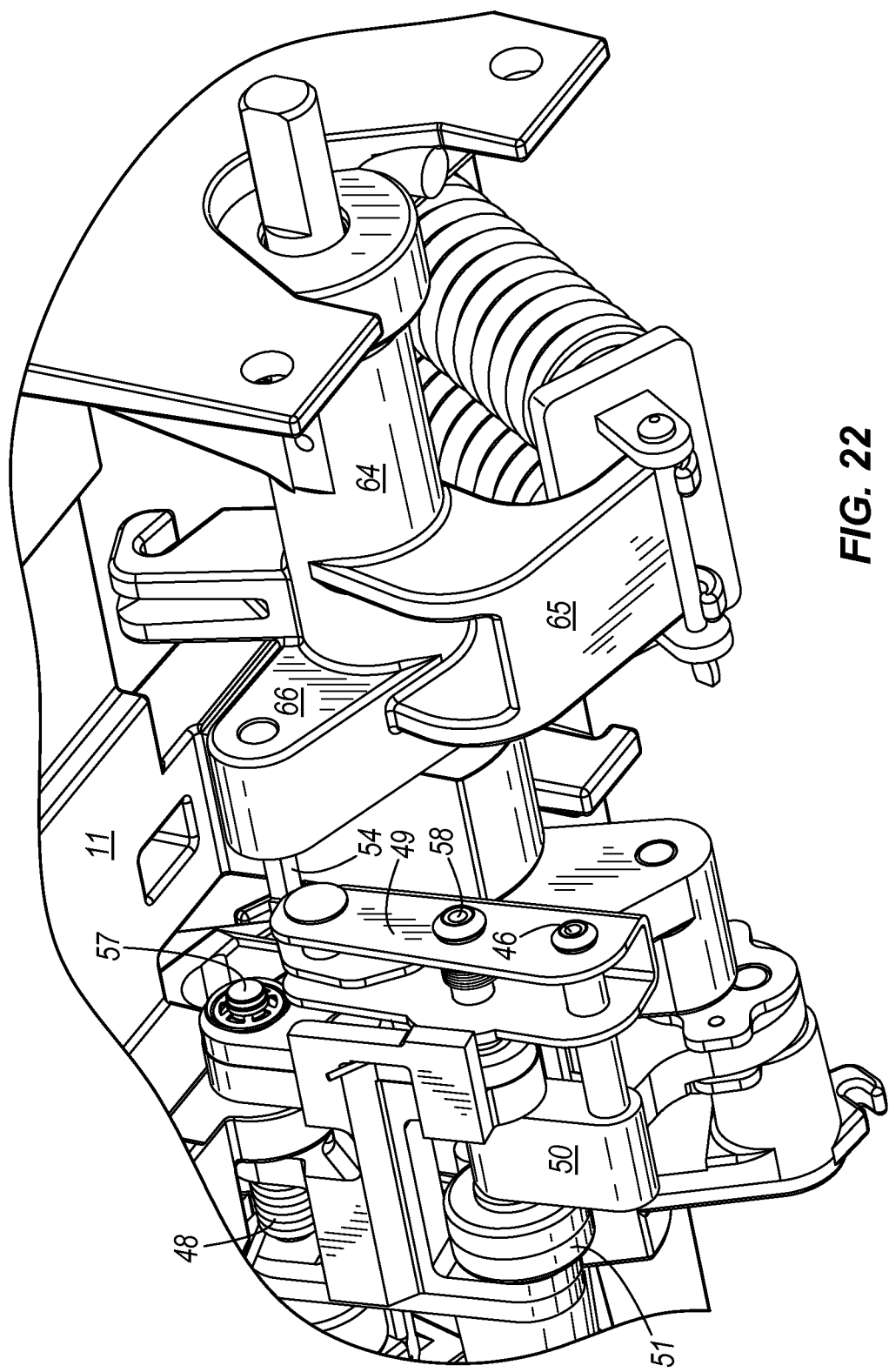
FIG. 22 is a partial perspective view of FIG. 20 showing the accelerator pedal in an unactuated state and the lever of the parking brake engagement assembly abutting the pin on the accelerator pedal assembly.

Once the parking brake is engaged it may be released upon actuation of the accelerator pedal 12. As illustrated in FIG. 12, a pin 54 is couple to a portion of the accelerator pedal assembly. When the parking brake is engaged, the lever 49 coupled to the carriage 45 abuts this pin 54 and is biased towards the pin 54. The lever 49 is pivotally coupled to the carriage 45 about the second pivot point 58 and pivotable about the second pivot point 58 independent of the carriage 45. Without the lever 49 abutting the pin 54, the parking brake could disengage due to a torque placed on the engagement element 50 by the toothed portion 53. Thus, when the pin 54 is moved away from the lever 49 (by actuation of the accelerator) the torque placed upon the engagement element 50 from toothed portion 53 coupled to the brake assembly 13 may cause the engagement element 50 to pivot about the second pivot point 58 and the parking brake to release.

Figure 23:
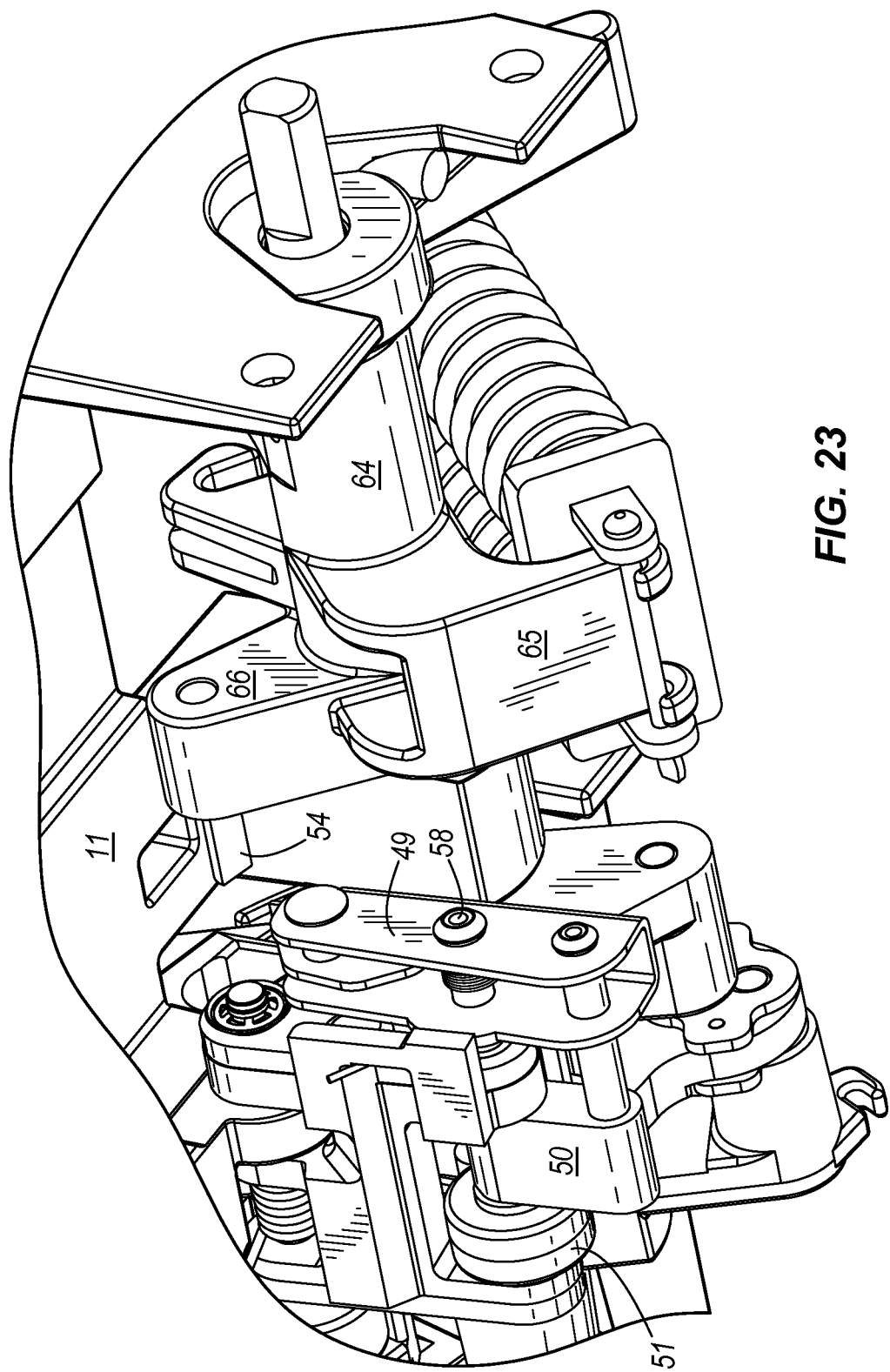
FIG. 23 is a partial perspective view similar to FIG. 22 showing the accelerator pedal assembly actuated and the lever of the parking brake engagement assembly no longer abutting the pin on the accelerator pedal assembly.
Figure 27A:
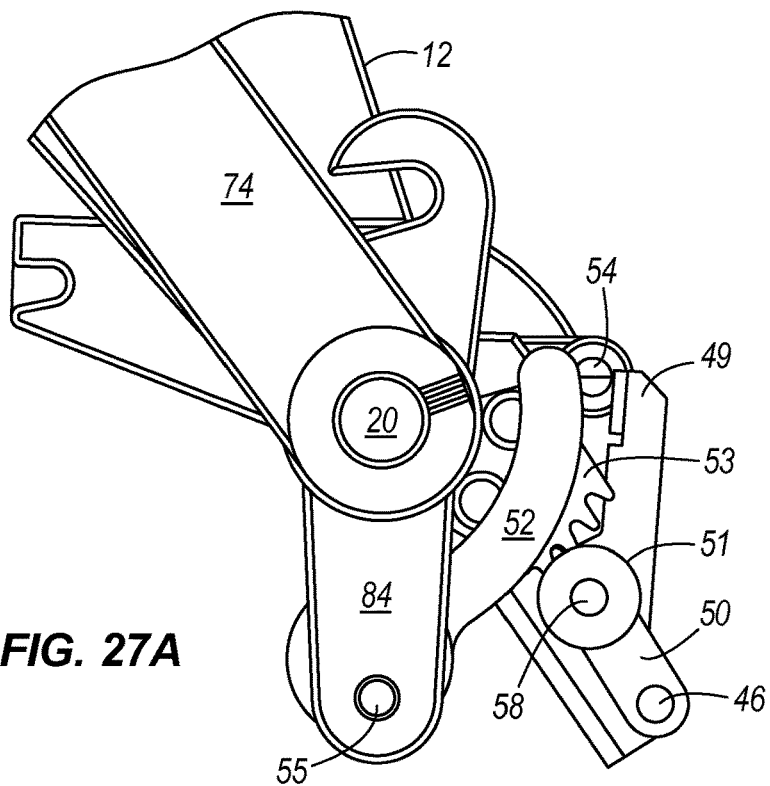
FIG. 27A is a simplified side view of the pedal assembly illustrated in FIG. 24 showing parking brake engaged, the accelerator pedal assembly in the unactuated state, and the lever of the parking brake engagement assembly abutting the pin on the accelerator pedal assembly.
Figure 27B:
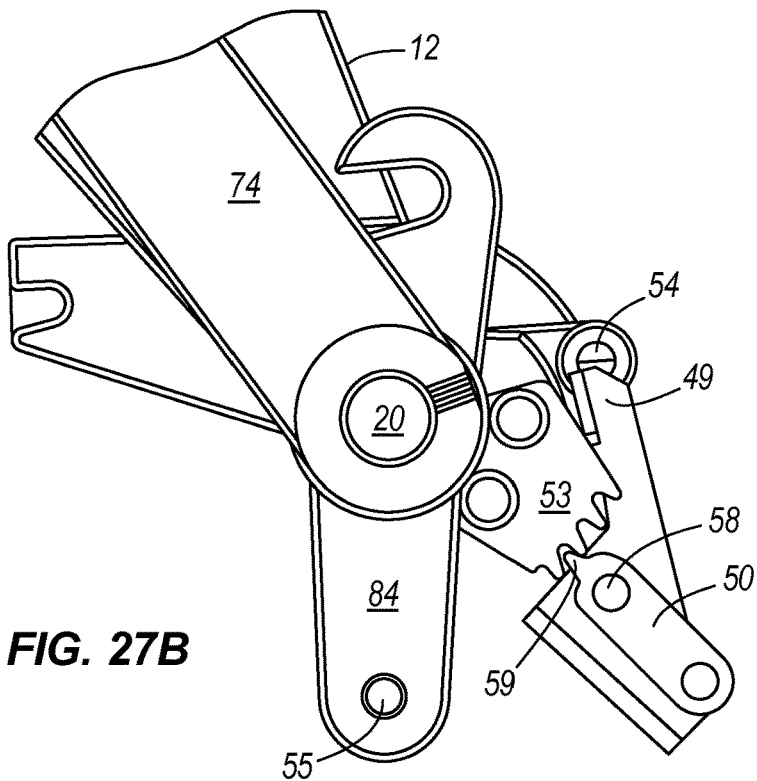
FIG. 27B is substantially the same view as illustrated in FIG. 27A showing the parking brake becoming disengaged due to actuation of the accelerator pedal assembly.
Figure 28:
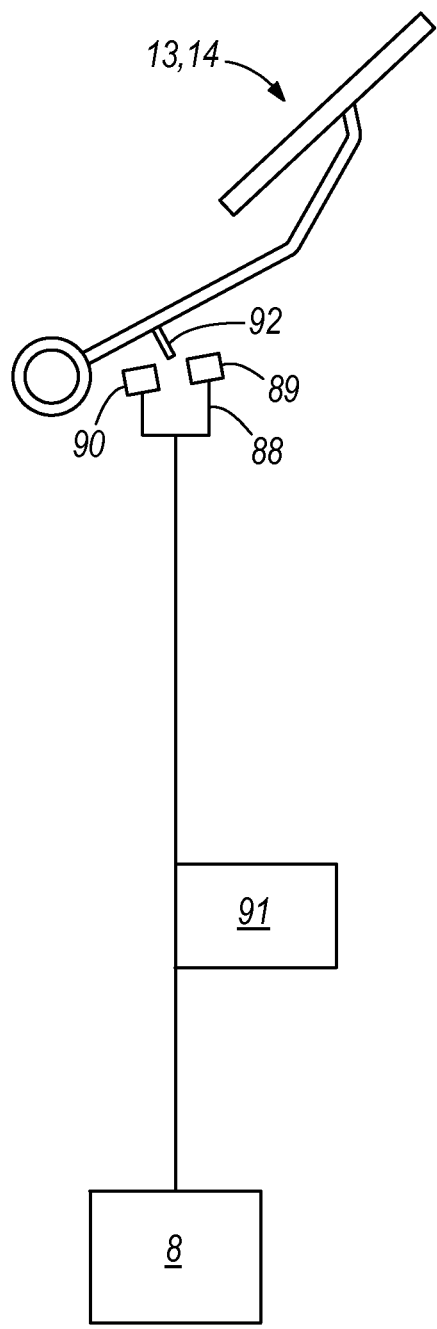
FIG. 28 is a more diagrammatic illustration of non-contact switch coupled to a brake pedal, a timer, and brake lamps.

As shown if FIGS. 23 and 27B, upon substantial actuation (4 degrees in the illustration) of the accelerator pedal 12, the lever 49 no longer abuts the pin 54. Thus, the engagement element 50 is able to pivot about the second pivot point 58 to release the parking brake. As mentioned above, the engagement element 50 may be caused to pivot about the second pivot point 58 by the torque placed upon it from the parking brake assembly, from bias elements 48 coupled to the carriage 45, or any combination thereof.

Figure 24:
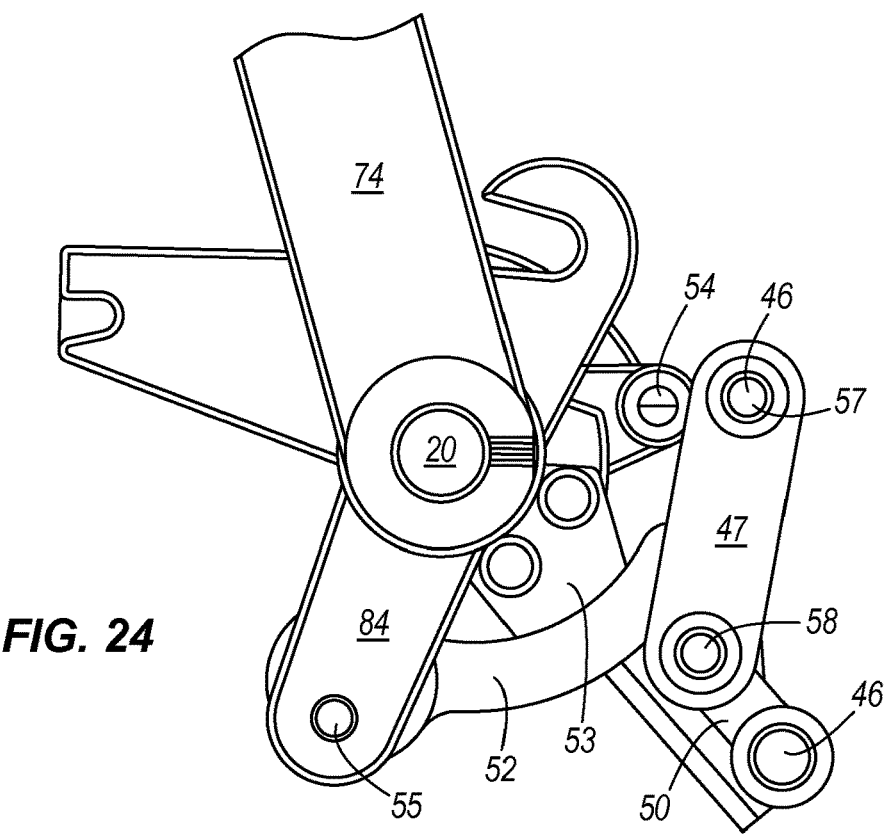
FIG. 24 is a simplified side view of the pedal assembly illustrated in FIG. 10 showing some of the components comprising the parking brake engagement assembly including the arm, the engagement element, and the serrate portion.
Figure 25A:
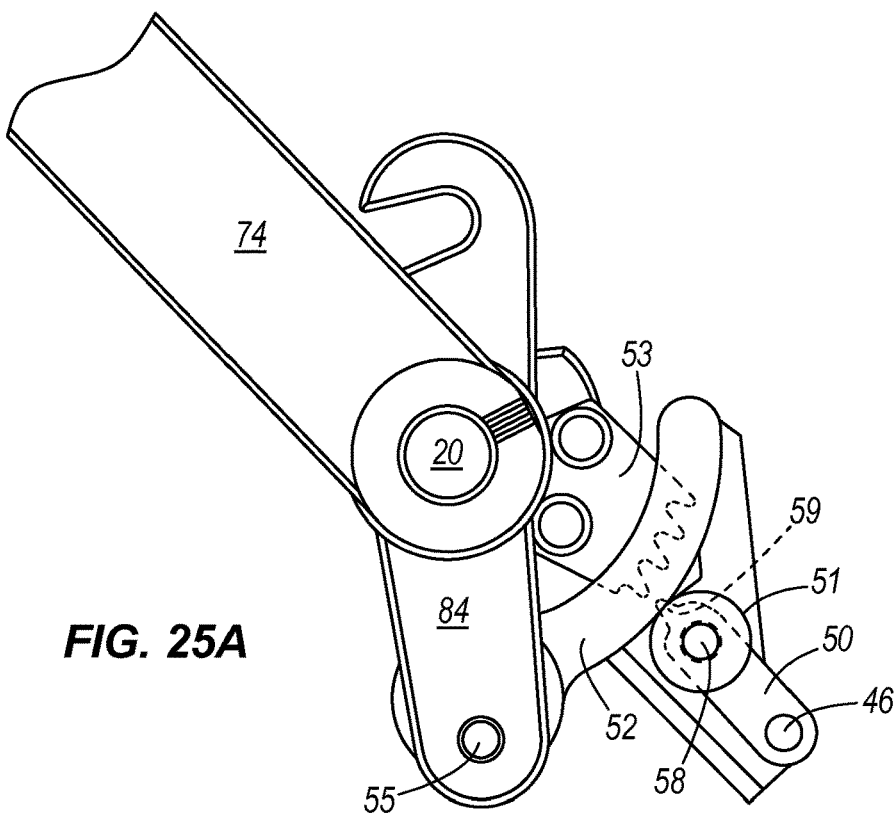
FIG. 25A is a simplified side view of the pedal assembly illustrated in FIG. 24 showing the cam surface on the arm engaging a roller on the carriage to prevent engagement of the parking brake as the service brake is actuated.

The operation of the parking brake assembly will now be discussed with reference to FIGS. 24-27. FIG. 24 shows a parking brake assembly in the disengaged state. In other words, the parking brake is not engaged. As illustrated, the carriage 45 has a first pivot point 57, a second pivot point 58, and an engagement element or pawl 50 attached to the carriage 45 at the second pivot point 58. An arm 52 is coupled to the brake pedal assembly 13, 14 and engages a portion of the carriage 45 to prevent the parking brake from engaging. FIG. 25A shows the assembly illustrated in FIG. 24 with several parts removed for the sake of clarity. This figure also shows the service brake pedal 13 actuated. As previously discussed, actuation of the service brake pedal 13 also causes actuation of the parking brake pedal 14. However, the parking brake pedal 14 is not actuated with respect to the service brake pedal 13 in this figure. Thus, although the arm 52 is actuated relative to the base 11, the arm 52 stays in the first position illustrated in FIG. 24 with respect to the pedals 13, 14 and prevents the engagement element 50 from engaging the toothed portion 53 due to a roller 51 on the carriage 45 riding on a cam surface of the arm 52.

Figure 25B:
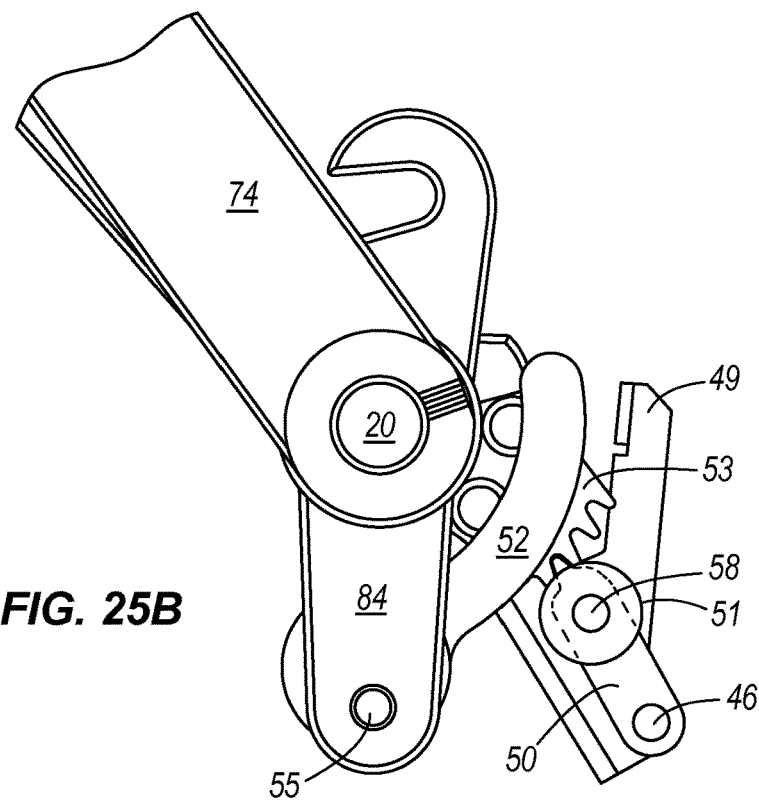
FIG. 25B is a simplified side view of the pedal assembly illustrated in FIG. 24 showing the cam surface on the arm disengaged from the roller on the carriage due to actuation of the parking brake pedal with respect to the service brake and allowing engagement of the parking brake.
Figure 26:
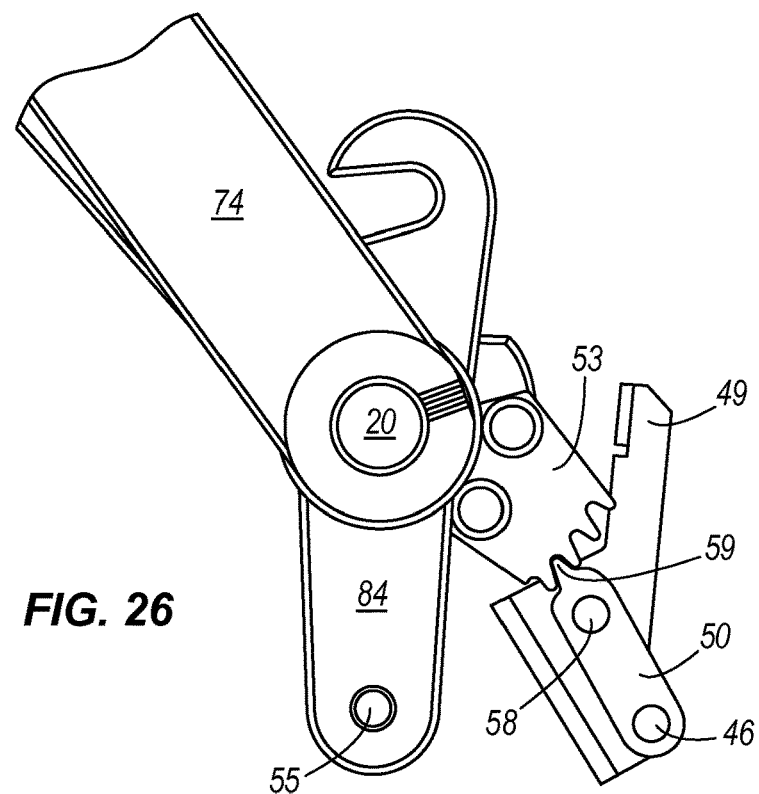
FIG. 26 is substantially the same view as illustrated in FIG. 25B with the arm and roller removed for clarity.

Referring to FIG. 25B, however, shows the service brake pedal 13 actuated and the parking brake pedal 14 actuated with respect to the service brake pedal 13. As such, the arm 52 pivots (with respect to the pedals) to the second position shown in this figure and enables the parking brake to engage. With the parking brake engaged, a projection 59 on the engagement element 50 engages the toothed portion 53 and holds the service brake pedal 13 in the actuated position. Thus, this illustration shows the parking brake in the engaged position. FIG. 26 also illustrates the parking brake in the engaged position with several parts, such as the arm 52 and roller 51 removed for clarification. FIG. 27A is similar to FIG. 25B, however, it further illustrates the pin 54 on the accelerator 12, which prevents the engagement element 50 from being torqued out of engagement with the toothed portion 53.

Finally, FIG. 27B illustrates the accelerator 12 actuated by about four degrees from the at rest, unactuated or initial position $P_{B1}$. As such, the pin 54 on the accelerator 12 no longer abuts the lever 49 adjacent the carriage 45. Thus, as illustrated, the engagement element 50 is capable of rotating about the second pivot point 58 to begin disengaging the parking brake. Although not illustrated in this figure or any other figures, the engagement element 50 would continue to rotate about the second pivot point 58 and completely disengage the parking brake.

The brake system 4 may also include an infrared switch 88 or other non-contact sensor to detect actuation of the brake pedal assembly 13. This switch 88 may be coupled to the brake lamps 8 to indicate whether the brake pedal 13 is actuated. The switch may have a receiver 90 and a transmitter 89 communicating with the receiver 90. Any change in the state of the message received by the receiver 90 indicates that the state of the brake pedal 13 has changed.

The brake lamp switch 8 in some embodiments is a solid state construction, with the switch attached to the base 11 of the pedal assembly 10. A shutter 92 is attached to the service brake 13 and moveable with the service brake 13. As the service brake 13 is actuated, the shutter 92 moves within a groove in the switch housing 88. In some embodiments, the switch 88 may have positive switching circuitry including a normally open state. Thus, when the shutter 92 disrupts the infrared beam or communication between the transmitter 89 and the receiver 90, the circuit closes and the brake lamps 8 are illuminated. Furthermore, movement of the pedal 13 back to the unactuated state would move the shutter 92 and discontinue output of the brake lamps 8.

Since the parking brake pedal 14 and the service brake pedal 13 are arranged in some embodiments to be driven together, either brake pedal may actuate the light switch 88. As the infrared switch 88 is a non-contact switch, wear is eliminated. The switch 88 may allow the brake lamps 8 to be illuminated while the vehicle 1 is in the parked condition. The brake lamp illumination system may be equipped with a timer 91 to provide illumination of the brake lamps 8 when the car is parked. The timer 91 may be programmed to allow the brake lamps 8 to be illuminated for a predetermined period of time while the parking brake is engaged. A period of several minutes, such as four minutes for example, is reasonable to avoid dangerous situations, but yet preserves battery life of the vehicle 1. Once timed out, the brake lamps 8 may no longer be illuminated without another input into the system, such as re-actuation or further actuation of the brake pedal 13.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the features and elements of the assemblies are described with reference to a particular referenced assembly. With the exception of features, elements, and manners of operation that are mutually exclusive to or are inconsistent with each illustrated embodiment described above, it should be noted that the alternative features, elements, and manners of operation described with reference to each of the assemblies are applicable to the other embodiments. Additionally, the infrared switch 88 and/or the timer 91 described above may be coupled to a vehicle in a conventional manner individually or as a modular unit. Similarly, the parking brake engagement assembly 44 discussed above may be mounted to a vehicle 1 in a conventional manner individually, may be mounted to a vehicle as a modular parking brake assembly, or may be mounted to a vehicle 1 as part of a modular pedal assembly 10. Furthermore, although the embodiments discussed above are illustrated and referenced with regard to a vehicle, the teachings of the present invention apply equally to many types of vehicles, including utility vehicles.

Various features and advantages of the invention are set forth in the following claims.

What is claimed is:

1. A modular pedal assembly for use with a vehicle, the vehicle including a prime mover, and a brake assembly, the pedal assembly comprising:
   a base removably connected with the vehicle;
   a brake pedal having a brake pedal pad and a brake pedal lever arm connected thereto, the brake pedal movably coupled with the base and operatively coupleable with the brake assembly;
   a parking brake pedal having a parking brake pedal pad and a parking brake pedal lever arm connected thereto, the parking brake pedal movably coupled with the base and wherein the parking brake lever arm is slidingly engageable and nested within a slotted portion of the brake pedal lever arm substantially over the length of the brake pedal lever arm;
   an accelerator pedal having an accelerator pedal pad and an accelerator pedal lever arm, the accelerator pedal movably coupled with the base so as to be displaceable between a first position and a second position;
   a control output regulator coupled to the accelerator pedal and including a first sensor and a second sensor, and electrically connected with the prime mover when the base is connected with the vehicle;
   wherein the first sensor enables operation of the prime mover and the second sensor generates a control signal for operation of the prime mover; and
   wherein the base has a top side having a top side face and an opposing bottom side having an opposing bottom side face, the opposing bottom side face defining a mounting surface for connection to the vehicle and located opposite the top side face, wherein the brake pedal is pivotably coupled with the base, wherein the accelerator pedal arm is pivotably connected to the base, wherein the brake pedal pad and an accelerator pedal pad of the accelerator are located on the top side, wherein a pivot point of the brake pedal and a pivot point of the accelerator pedal are disposed on the opposing bottom side of the base and offset from the bottom side face in a direction away from the top side face, and wherein the accelerator pedal arm extends through the base past the top side and past the bottom side such that a portion of the accelerator pedal arm resides past the top side face and a portion of the accelerator pedal arm resides past the bottom side face; and
   wherein the top side of the base includes a top side length and a top side width, wherein the top side length is greater than the top side width, wherein the top side length has a first end opposite a second end, and wherein the parking brake pedal and the accelerator pedal are located between the first end and the second end.

2. The modular pedal assembly as recited in claim 1, further comprising a plurality of fasteners; wherein the entire modular pedal assembly is mounted to the vehicle by mounting the base to the vehicle with the fasteners, and wherein the entire modular pedal assembly is removed from the vehicle by removal of the fasteners from the base.

3. The modular pedal assembly as recited in claim 1 wherein: the brake pedal is displaceable between a first position at which the brake assembly is inactivated and a second position at which the brake assembly is activated, the brake pedal being releasably lockable at the second position; and the accelerator pedal is operatively coupled with the brake pedal such that when the brake pedal is locked at the second position, displacement of the accelerator pedal releases the brake pedal from the second position.

4. The modular pedal assembly as recited in claim 1 wherein the control output regulator is disposed within a housing removably connected with the base so as to position the control output regulator generally proximal to the accelerator pedal.

5. The modular pedal assembly of claim 1, wherein: the prime mover is an electric motor; the first sensor is a limit switch actuatable to turn on a control circuit of the motor; and the second sensor is a variable resistor that generates a signal proportional to a displacement of the accelerator pedal between the first position and the second position.

6. The modular pedal assembly as recited in claim 5 wherein: the vehicle includes a battery, and the control circuit is configured to regulate voltage or current between the battery and the motor; and the control circuit adjusts the voltage or current to the electric motor in response to the signal generated by the variable resistor.

7. The modular pedal assembly of claim 1, wherein: the prime mover is an internal combustion engine; the first sensor is a limit switch operable to turn on a control circuit of the internal combustion engine; and wherein the second sensor is a limit switch operable to control a spark plug ignition of the internal combustion engine.

8. The modular pedal assembly as recited in claim 7 wherein: the control circuit includes a solenoid operatively coupled with a starter motor; and the first sensor is electrically connected with the solenoid such that the solenoid is electrically connected with the starter motor when the accelerator pedal displaces from the first position and towards the second position.

9. The modular pedal assembly as recited in claim 7 wherein: the control circuit includes a magneto electrically coupled with the spark plug ignition; and the second sensor is electrically connected with the magneto such that the magneto is electrically coupled with the spark plug ignition when the accelerator pedal displaces from the first position and towards the second position.

10. The modular pedal assembly of claim 1, wherein the parking brake lever arm is movable with the brake lever arm when the brake pad is depressed and the parking brake lever arm is movable relative to the brake lever arm when the parking brake pad is depressed.

11. The modular pedal assembly of claim 1, wherein the slotted portion the brake pedal lever arm is a slotted channel having opposing sides between which nest the parking brake pedal lever arm; and wherein opposing flanges are generally flat and have attachment points for connection to the vehicle, the opposing flanges located in a common plane with the top side of the base.

12. The modular pedal assembly of claim 11, wherein the brake pedal pad includes a bottom and top edge, and wherein at least one of the opposing sides of the brake pedal lever arm extends from a pivot mount point proximate a first end of the brake lever arm toward the bottom edge of the brake pedal pad, and wherein the opposing flanges are connected by a spanning portion of the base that extends between the opposing side ends, the spanning portion in the same plane as the opposing side ends.

13. The modular pedal assembly of claim 12, wherein the parking brake pedal lever arm is elongate in shape and received within the slotted channel of the brake pedal lever arm, and wherein the at least one of the opposing sides of the brake pedal lever arm extends past the bottom edge of the parking brake pedal pad toward a second end of the brake lever arm.

14. The modular pedal assembly of claim 1, wherein the base further includes a peripheral boundary defining outer edges of the top side and outer edges of the bottom side, the peripheral boundary including a base front, base back, and opposing side ends, the peripheral boundary having an interior into which the pedals are disposed.

15. The modular pedal assembly of claim 14, wherein the opposing side ends each have a side end top side characterized by a side end length and a side end width, the side ends each also including a side end thickness smaller than the respective side end length and side end width, each side end top side extending in a direction coincident with a direction of the base top side.

16. The modular pedal assembly of claim 15, wherein the opposing side ends include openings for the receipt of fasteners to secure the base to the vehicle.

17. A modular pedal assembly mountable as a module upon a vehicle having a brake assembly and adaptable for use on the vehicle having either a gas engine or an electric motor drive, the modular pedal assembly having a mounted state in which the modular pedal assembly is mounted in the vehicle and an unmounted state, the modular pedal assembly comprising:

a base adapted to be mounted in a vehicle in the mounted state;

a first pedal having a first pedal pad and a first pedal lever arm pivotally coupled to the base in the unmounted state of the modular pedal assembly and having a portion coupled to the brake assembly in the mounted state of the modular pedal assembly;

a second pedal having a second pedal pad and a second pedal lever arm, the second pedal pivotally coupled to the base in the unmounted state of the modular pedal assembly and having a portion coupled to the drive in the mounted state of the modular pedal assembly, the second pedal having an unactuated state and an actuated state, the actuated state defined by pivotal movement of the second pedal with respect to the base;

a third pedal having a third pedal pad and a third pedal lever arm nestingly received within the first pedal lever arm over a length of the first pedal lever arm between a pivot point and a bottom edge of the first pedal pad, the third pedal lever arm pivotally coupled to the base in the unmounted state of the modular pedal assembly and having a portion coupled to the brake assembly in the mounted state of the modular pedal assembly;

a control output regulator coupled to the second pedal in the unmounted state of the modular pedal assembly and also electrically coupled to the drive assembly in the mounted state of the modular pedal assembly, the control output regulator adaptable to be used with vehicles driven by gas engines and electrical motors, the control output regulator having a sensor configured to detect the pivotal position of the second pedal and to communicate the position to drive in the mounted state of the modular pedal assembly; and an abutment connected to the first pedal configured to engage the third pedal after the third pedal pad is moved to a predetermined position causing the first pedal to move with the third pedal over a predetermined range of motion;

wherein the base is in the form of an elongate shape that extends past opposing lateral sides of the first pedal and the second pedal such that both the first pedal and the second pedal are located between ends of the elongate shape;

wherein the base further includes a peripheral boundary defining outer edges of a top side and outer edges of a bottom side, the peripheral boundary including a base front, base back, and opposing side ends, the peripheral boundary having an interior into which the pedals are disposed;

wherein the opposing side ends each have a side end top side characterized by a side end length and a side end width, the side ends each also including a side end thickness smaller than the respective side end length and side end width, each side end top side extending in a direction coincident with a direction of the base top side; and wherein the top side of the base includes a top side face, the bottom side of the base includes a bottom side face, the bottom side face having a mounting surface for connection to the vehicle wherein the first pedal is pivotally coupled with the base a first distance away from the bottom side face in a direction away from the top side face, wherein the second pedal arm is pivotally connected at a pivot point with the base a second distance away from the bottom side face in a direction away from the top side face, and wherein the second pedal arm extends through the base past the top side and the past the bottom side such that a portion of the second pedal arm resides past the top side face and a portion of the accelerator pedal arm resides past the bottom side face.

18. The modular pedal assembly as recited in claim 17, wherein the sensor is a first sensor and the control output regulator further includes a second sensor positioned to detect the pivotal position of the second pedal and able to communicate the position to the drive in the mounted state of the modular pedal assembly.

19. The modular pedal assembly as recited in claim 18, wherein the first sensor is a limit switch and the second sensor is a potentiometer, the limit switch senses the state of the second pedal in the mounted state of the modular pedal assembly and communicates the state to the electrical motor drive, the potentiometer senses the state of the second pedal in the mounted state of the modular pedal assembly and communicates the state to the electrical motor drive by sending a voltage that varies with the position of the second pedal.

20. The modular pedal assembly as recited in claim 18, wherein the first sensor is a first limit switch and the second sensor is a second limit switch, the first and second limit switches having an open and closed state, the first limit switch senses the state of the second pedal in the mounted state of the modular pedal assembly and communicates the state to the gas engine drive via a first circuit, the second limit switch senses the state of the second pedal in the mounted state of the modular pedal assembly and communicates the state to the gas engine drive via a second circuit, the gas engine drive operable with the first limit switch closed and the second limit switch open and inoperable with the first limit switch open and the second limit switch closed.

21. The modular pedal assembly of claim 17, wherein the third pedal is movable relative to the first pedal between first and second positions corresponding to a parking brake being inactivated and activated, respectively.

22. The modular pedal assembly of claim 21, further comprising:
an engagement element connected to a lever at one end and a pivot pin at the opposing end;
a projection extending from the opposing end of the engagement element;
a toothed portion operably connected to the brake assembly and configured to lockingly engage with the projection when the parking brake is activated;
an arm movable between first and second positions, wherein the arm prevents the projection of the engagement element from engaging with the toothed portion in the first position and permits engagement of the projection and the toothed portion in the second position; and
wherein the lever operable to move the arm between the first and second positions and pivot the engagement element.

23. The modular pedal assembly of claim 22, wherein displacement of the second pedal releases the third pedal from the second position.

* * * * *